United States Patent [19]

Pinede et al.

[11] Patent Number: 4,570,035
[45] Date of Patent: Feb. 11, 1986

[54] PROGRAMMABLE KEY TELEPHONE SYSTEM

[75] Inventors: Edouard Pinede, Norwalk; Serge Faublas, Monroe; Peter F. Stevens, Trumbull, all of Conn.

[73] Assignee: PKS/Communications, Inc., Milford, Conn.

[21] Appl. No.: 616,437

[22] Filed: May 31, 1984

[51] Int. Cl.$^4$ .............................................. H04Q 5/18
[52] U.S. Cl. ............................... 179/99 LS; 179/99 R
[58] Field of Search ............. 179/99 R, 99 A, 99 LS, 179/99 M, 99 P, 18 B

[56] References Cited

U.S. PATENT DOCUMENTS

| | | | |
|---|---|---|---|
| 4,160,131 | 7/1979 | Kaul et al. | 179/99 M |
| 4,203,011 | 5/1980 | Coviello | 179/99 M |
| 4,338,495 | 7/1982 | Bloch et al. | 179/99 M |
| 4,382,163 | 5/1983 | White et al. | 179/99 LC |
| 4,438,432 | 3/1984 | Hurcum | 340/825.35 |
| 4,441,106 | 4/1984 | Jackson | 340/811 |
| 4,453,040 | 6/1984 | Wolf et al. | 179/81 C |
| 4,491,693 | 1/1985 | Sano et al. | 179/99 R |

OTHER PUBLICATIONS

Griffiths et al., "A New Concept in PABX Operator's Console", *Int. Conf. on Private Electronic Switching Systems*, London, Eng., 4-10-78.

*Primary Examiner*—Gene Z. Rubinson
*Assistant Examiner*—Elio Di Vito
*Attorney, Agent, or Firm*—Barry R. Lipsitz

[57] ABSTRACT

A programmable key telephone system has a key service unit with a plurality of telephones coupled thereto. The key service unit is controlled by a microcomputer. An alphanumeric display mounted in the key service unit is coupled to the microcomputer and is driven during an installation mode of operation to prompt an installer through a sequence of steps designed to elicit instructions for programming system features. A telephone from the key telephone system is coupled by the installer to the microcomputer and used as a data input terminal to enable the installer to input instructions via the telephone's keys. Non-volatile memory is coupled to the microcomputer for storing system feature data in accordance with instructions entered by the installer. Indicator lamps on the data entry telephone can provide additional prompting or feedback to the installer as to features being programmed. Programming of the system can be accomplished without interrupting normal telephone operation.

12 Claims, 5 Drawing Figures

PROGRAMMABLE KEY TELEPHONE SYSTEM

BACKGROUND OF THE INVENTION

The present invention relates to key telephone systems and more particularly to a key telephone system which is programmable at the site of installation to implement different features.

Key telephone systems generally comprise a plurality of telephones (also referred to as "telephone stations") and a central key service unit ("KSU") which interconnects the telephones with each other and to outside telephone trunk lines. The KSU provides control functions for the key telephone system and establishes communication paths between telephone stations. When outside calls are involved, the KSU establishes communication paths between telephone stations and telephone trunk lines.

Depending upon their sophistication and complexity, key telephone systems can provide a wide variety of system features. Examples of such features include the designation of which telephone(s) in the system can originate and terminate pages; provision for night transfer service including station service and automatic answering device service; message waiting indication; designation of call pick-up groups, call distribution groups, and group answering; central office ring assignments; telephone station outgoing call restrictions; provision of private lines to certain telephone stations; soft page groups; barge in capability; amplification for hard of hearing users; call waiting tones; timers for flash key, central office release, hold recall, and camp-on; automatic central office line selection; auto ringing line selection; central office line call back waiting time selection; and others.

In the past, installation of such features has generally been made at the time of manufacture of the key telephone system. Some key telephone systems provide for programming such features during system installation at the user's premises. In such cases, however, it has been necessary for the system installer to use a special terminal at the time of installation to program desired features into the key telephone system. The use of such separate installation terminals is both expensive and often impractical.

It would be advantageous to provide a key telephone system which can be programmed or re-programmed at any time, at the user's premises, without the need for special equipment. The programming of such a system should be straightforward and easy to accomplish without extensive training. It would be further advantageous to provide a key telephone system wherein re-programming of system features can be accomplished while the system is in use, without affecting the normal operation of the system during the re-programming activity.

The present invention provides to such a key telephone system.

SUMMARY OF THE INVENTION

In accordance with the present invention, a programmable key telephone system is provided having a KSU and a plurality of telephones coupled to the KSU. The telephone system comprises a microcomputer and an alphanumeric display coupled to the microcomputer. Means operatively associated with the microcomputer are provided for driving the display to prompt an installer through a sequence of steps designed to elicit instructions for programming system features. Means are provided for coupling a telephone from the key telephone system to the microcomputer to enable an installer to input instructions via the telephone's keys. Non-volatile memory means are coupled to the microcomputer for storing system feature data in accordance with instructions entered by an installer.

In one embodiment, the microcomputer, display, driving means, coupling means and non-volatile memory means are all part of the KSU. Telephone interface circuit means can be provided in the KSU for coupling the plurality of telephones to the microcomputer in order to provide data communication between the microcomputer and telephones during the normal operation of the telephone system. An installer switch means is provided for disconnecting one of the telephones from the telephone interface circuit means and for placing the microcomputer into an installation mode of operation. In this manner, a telephone to be used by an installer for programming system features can utilize the portion of the interface circuitry normally provided for the disconnected telephone.

Means can be provided for operating the microcomputer to provide normal telephone operations (for all but the disconnected telephone) while simultaneously operating in the installation mode. The provision of such means enables system features to be programmed or re-programmed without interrupting the normal operation of the telephone system.

Each of the telephones in the key telephone system can comprise a plurality of switches and a plurality of indicator lamps, each associated with one of the switches. During the normal operation of the telephone, the switches are used for placing calls and implementing features provided by the telephone system. The indicator lamps provide status information as to calls being placed and/or features which are selected. When a telephone is used as a data input terminal during the installation mode of operation, the switches are used to enter instructions to the microcomputer. The telephone's indicator lamps, during the programming mode of operation, provide additional prompting to the system programmer as to features being programmed. In particular, the indicator lamps can be used during programming to identify which particular telephone station in the key telephone system is currently being programmed.

The alphanumeric display, together with the indicator lamps of the telephone being used by the installer as a data input terminal, can be used to sequentially step the installer ("system programmer") through a predetermined series of features to be programmed. Means can be provided for enabling the system programmer to skip over one or more categories of features for which prompts are provided.

DETAILED DESCRIPTION

Figure 1:
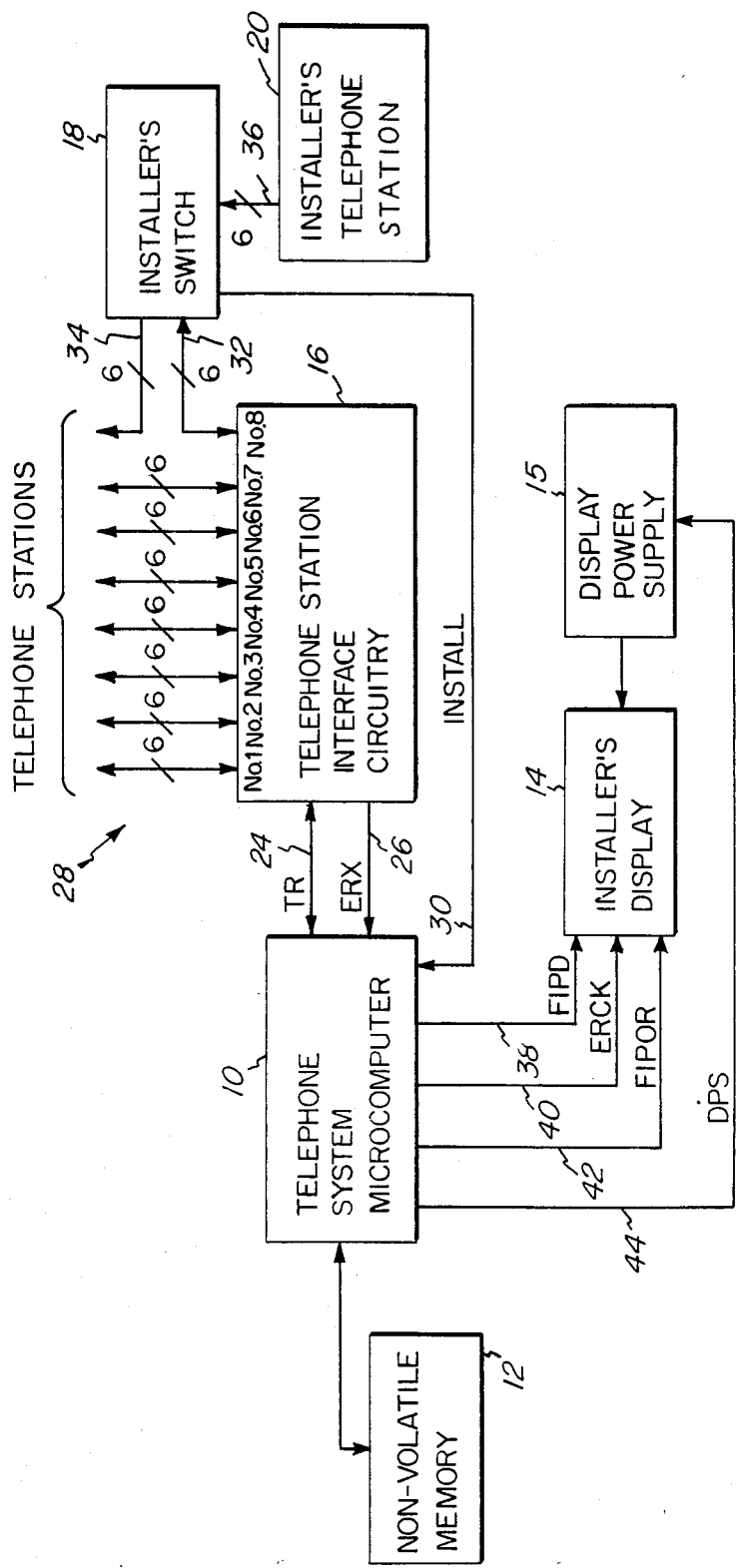
FIG. 1 is a block diagram of the data circuitry for the programmable key telephone system of the present invention.

The block diagram of FIG. 1 sets forth the basic data processing components of the programmable key telephone system of the present invention. A complete description of the audio portions of such a key telephone system is provided in commonly assigned copending U.S. patent application Ser. No. 616,566, filed May 31, 1984 entitled "KEY TELEPHONE SYSTEM", which is incorporated herein by reference.

The key telephone system includes a telephone system microcomputer 10 which includes a microprocessor, random access memory, read only memory, appropriate address and data buffers and buses, and a peripheral controller together with peripheral input/output ports for communicating with other system components. Microcomputer 10 is coupled via a bi-directional data line 24 ("TR") and an enable receive ("ERX") line 26 to telephone station interface circuitry 16. Station interface circuitry 16 is provided to couple individual telephones ("telephone stations") to the key telephone system. Although the telephone station interface circuitry 16 shown in FIG. 1 accomodates 8 separate telephone stations, those skilled in the art will recognize that additional station interface circuitry can be provided to accomodate a greater number of telephone stations, for example 16 such stations.

Each of the eight telephones coupled to telephone station interface circuitry 16 on lines 28 require four audio and two data lines. Thus, as indicated in FIG. 1, each of lines 28 is, in fact, a six wire cable. As indicated, the six wire cable for telephone station number 8 is routed to an installer's switch 18 on line 32, and back from switch 18 on line 34. An installer's telephone station 20 is coupled to telephone station interface circuitry 16 via six wire cable 36 and installer's switch 18. Installer's switch 18 is also coupled directly back to telephone system microcomputer 10, via line 30, to provide a signal to microcomputer 10 that an installation mode of telephone system operation has been entered.

Installer's telephone station 20 is identical to all of the other telephones in the system. In fact, in most situations field personnel installing the telephone system will not have their own separate telephone stations. Instead, in accordance with the present invention the installer will take one of the telephones provided with the telephone system out of service, and use it at the KSU as a data input terminal during programming or reprogramming of the telephone system at the customer's site. Upon completion of the programming task, the telephone used by the installer as a data input terminal will be returned to normal telephone service, usually in a user's office remote from the KSU.

Figure 2:
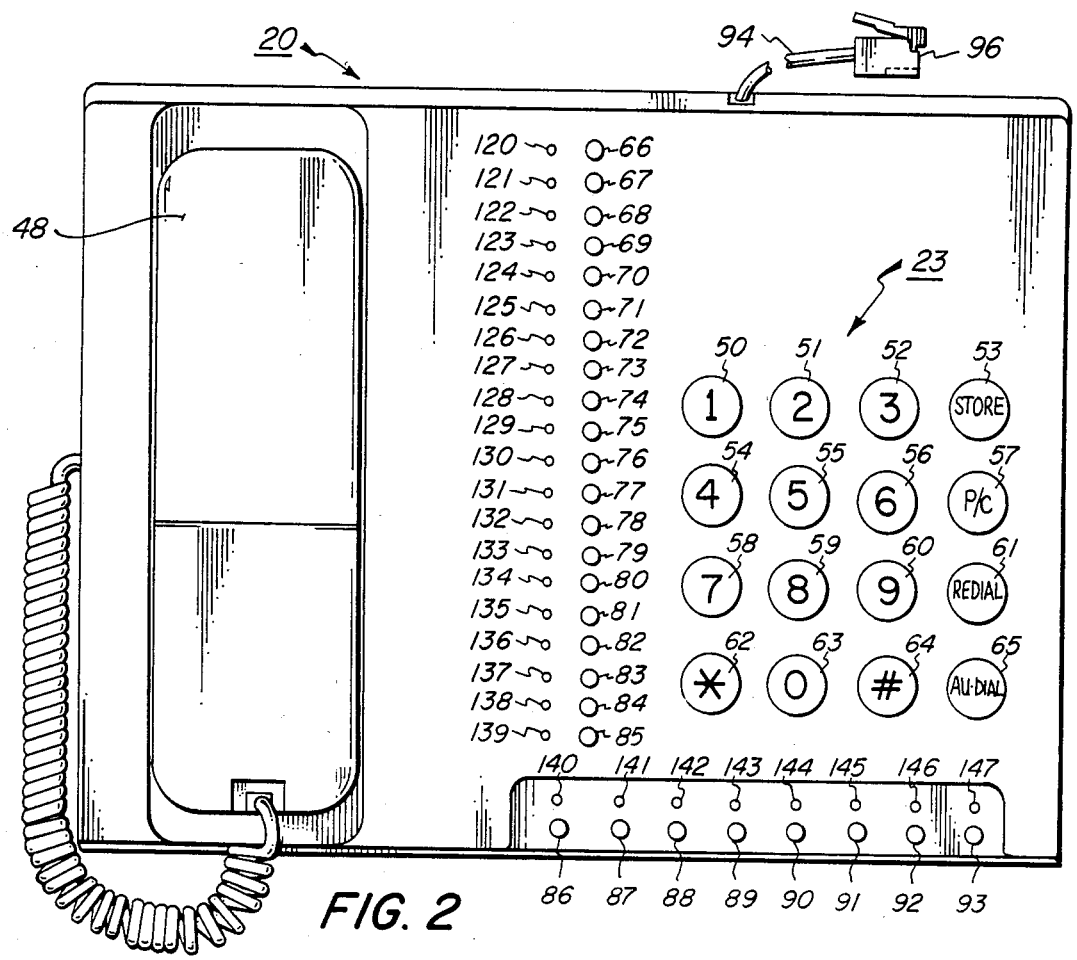
FIG. 2 is a top plan view of a telephone for use with the key telephone system.

As shown in FIG. 2, the telephones used in the system (e.g., telephone 20) are multi-button key telephones with keys (i.e., switches) 50 through 93 and indicator lamps or light emitting diodes ("LED"s) 120-147. A telephone handset 48 is also provided. Cable 94 together with modular telephone plug 96 enables the telephone 20 to be coupled to the key service unit for either normal telephone operation or for use by an installer as a data entry terminal.

The telephone keys are divided into four categories. A group of five keys 81-85 (together with associated LEDs 135-139) are used for access of central office telephone lines. Thus, in order to place an outside call, a user can seize one of five central office lines by actuating any of keys 81-85. When the central office line is seized, the corresponding LED 135-139 will light. If an LED 135-139 is already lit before a user decides to seize a line, he will choose a different line, which is not in use as indicated by an LED which is not lit.

Another group of 15 keys 66-80 (with associated LEDs 120-134) are used for direct station selection when calling another telephone within the key telephone system. Thus, if a telephone user wants to call another station in the system (e.g., the station represented by key 66 and LED 120) the user will merely actuate key 66. Actuation of this key will cause LED 120 to light and the corresponding telephone in the system to ring.

A third group of eight keys 86-93 and LEDs 140-147 are used for implementing features such as message wait, hold, call splitting, call transfer, do not disturb, microphone mute, page announcements, conference calls, and call back. Those familiar with the art will recognize that many different features are common in key telephone systems and can be provided through the use of keys such as keys 86-93 shown in FIG. 2.

The final group of keys comprises a digital key pad 23 which is provided with switches 50-65. Key pad 23 is used for dialing outside telephone numbers and additional feature access. For example, key 53 can be used to store a number for future access. Key 61 can be used to provide a redial feature. Other features which can be provided through the use of key pad 23 will be apparent to those skilled in the art.

Figure 3:
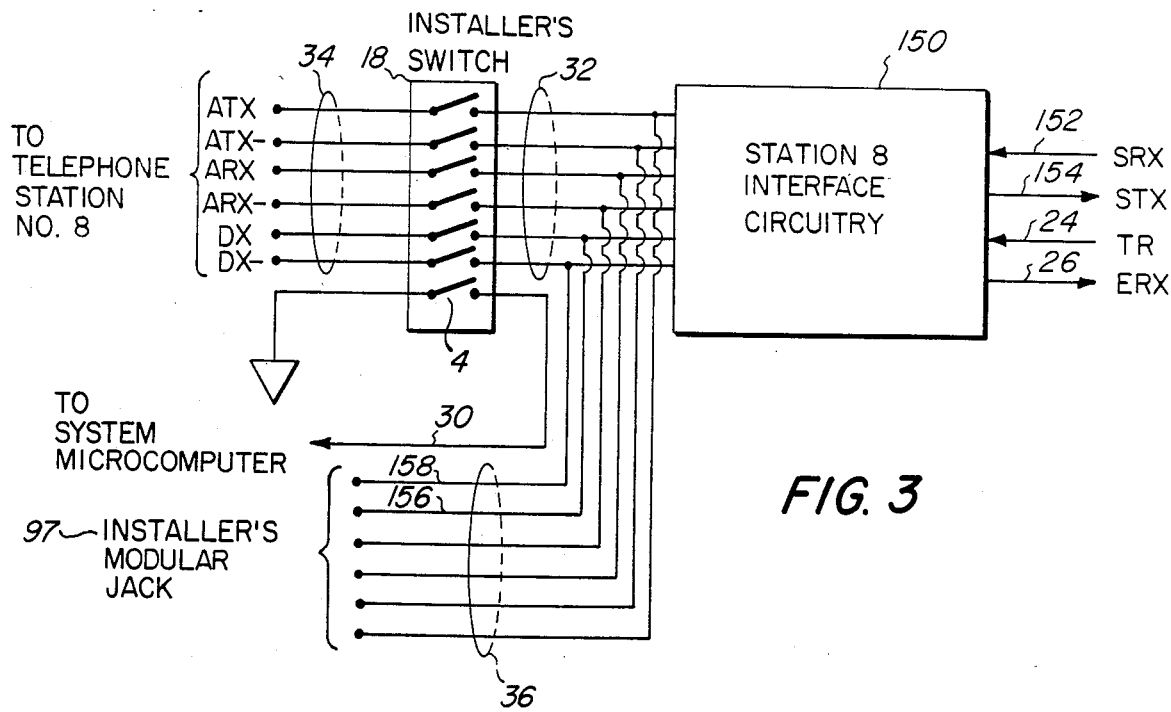
FIG. 3 is a diagram showing how the installer's switch and installer's telephone station are coupled to the interface circuitry for one of the telephone stations in the key telephone system.

FIG. 3 shows how telephone 20 can be coupled to telephone station interface circuitry 16 through the portion of such interface circuitry provided for telephone station number 8. The station 8 interface circuitry is designated by reference numeral 150 in FIG. 3, and is one section of the telephone station interface circuitry 16 referred to in FIG. 1. In fact, telephone station interface circuitry 16 comprises eight separate and identical portions of circuitry, one for each telephone station coupled thereto.

As shown in FIG. 3, station 8 interface circuitry 150 includes 6 input lines (cable 32) which are coupled through installer's switch 18 to telephone station number 8 via cable 34. The six lines coupling the telephone to the interface circuitry are designated ATX, ATX-; ARX, ARX-; and DX, DX-. The ATX lines are audio signals transmitted by the telephone station. The ARX lines are audio receive signals to be input to the telephone station. The DX lines are the data signals used for digital communication between telephone system microcomputer 10 and the telephone station.

When installer's switch 18 is in the open or "installation" position, as shown in FIG. 3, telephone station number 8 is not connected to the telephone station interface circuitry. Further, as indicated by switch closure 4, an install line 30 (which is coupled to telephone system microcomputer 10) is disconnected from ground when switch 18 is in the installation position. This provides a signal causing telephone system microcomputer 10 to enter an installation mode of operation.

In order to interact with the installation mode of operation, an installer or "system programmer" couples a telephone station to a modular jack 97, thereby coupling the telephone to the station 8 interface circuitry 150 via cable 36. For the sake of convenience, the telephone installer will usually use telephone station number 8 (which has been disconnected from the key telephone system by installer's switch 18) as the "installer's telephone station" 20 during system installation. The telephone installer could alternatively use any other telephone station as his data entry terminal for purposes of system programming or re-programming. However, no matter what physical telephone the installer uses, it will always be connected to the interface circuitry for station number 8 shown in FIG. 1, via installer's switch 18.

When a telephone is used as the installer's telephone station, data will be entered by the installer via the keys on the telephone. The data will travel on wires 156 and 158 of cable 36 to the DX and DX- inputs to station 8 interface circuitry 150. The interface circuitry 150 will convert the data from the telephone station into a form acceptable to telephone system microcomputer 10, and transmit the converted data "TR" on bidirectional data bus 24. The "SRX" and "STX" lines 152 and 154 shown in FIG. 3 are the audio receive and transmit signals for telephone station 8. Such audio signals are not used in the installation mode of operation.

When an installer's telephone station 20 is coupled to station 8 interface circuitry 150 by plugging the telephone into the installer's modular jack 97, and the installer's switch 18 is open as shown in FIG. 3, the key telephone system will be in condition for the programming of system features. An installer's display 14 (FIG. 1), coupled to telephone system microcomputer 10, will provide visual prompts in order to guide the installer through a sequence of steps designed to elicit instructions for programming system features. Installer's display 14 is powered by a display power supply 15, turned on by signal "DPS" on line 44 from microcomputer 10. Installer's display 14 can, for example, comprise an alphanumeric display driven by a controller such as the Rockwell 10937 "Intelligent Display Controller". The actual display can be any of those well known in the art, such a vacuum fluorescent, gas discharge, or LED display. In the case where a vacuum fluorescent display is used, fluorescent indicator panel data "FIPD" is provided on line 38 from microcomputer 10. A clock signal "ERCK" for the display is provided on line 40 from microcomputer 10. A power-on reset signal "FIPOR" is provided on line 42 from microcomputer 10.

Data entered by an installer via the installer's telephone station 20 is formatted for future use by microcomputer 10 and stored in non-volatile memory 12. Such non-volatile memory can comprise, for example, conventional random access memory with a battery backup In an exemplary embodiment, the first sixteen vertical column keys 66–81 on installer's telephone station 20 and the associated indicator lamps 120–135 can be used to represent sixteen possible telephones to be programmed in the system. These keys and lamps, together with the installer's display 14, provide the installer with alpha-numeric display and lamp prompting as a guide through the programming steps for telephone related features.

For features related to central office lines, the five central office line select keys 81–85 and associated indicator lamps 135–139 can be used. Again, these keys and lamps together with alpha-numeric display 14 provide prompting to guide the system programmer through the programming steps.

System related features to be programmed (i.e., those features which affect the operation of all stations in the key telephone system) are programmed using the installer's display 14 and selected keys and indicator lamps on the installer's telephone station.

Programming instruction entries for an exemplary embodiment of the invention are set forth on the "Program Record Sheets" appended hereto as "Appendix A" and made a part hereof. The program record sheets indicate the messages which will be displayed on installer's display 14 upon actuation of different keys on installer's telephone station 20. The sheets also indicate what actions an installer will have to take, in terms of depressing telephone keys, to implement various system features and define system functions.

Figure 4:
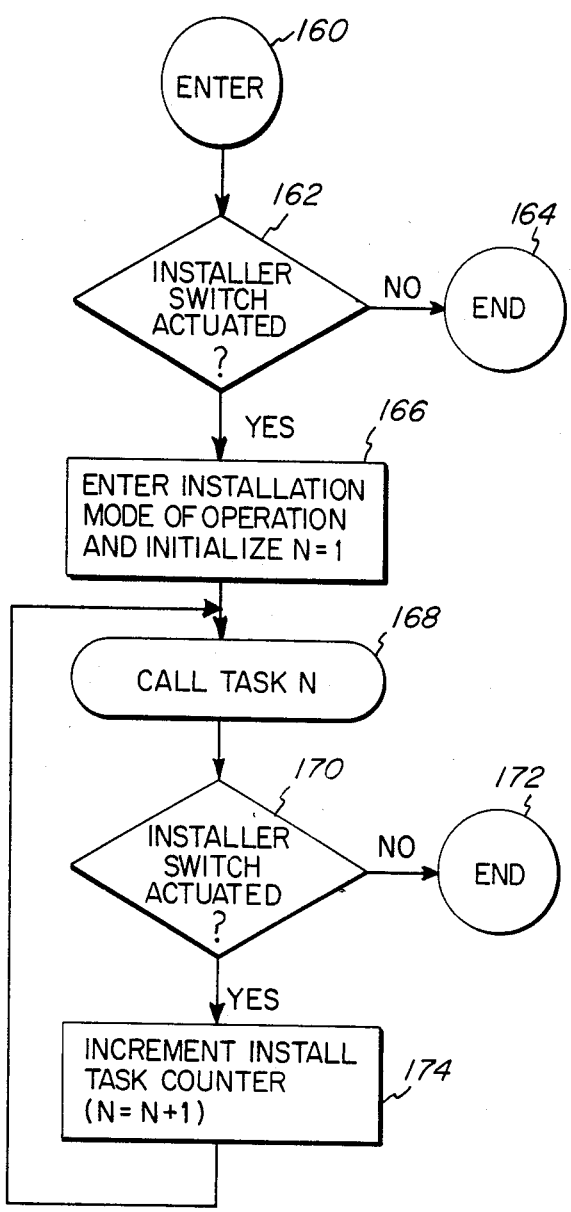
FIG. 4 is a flow chart showing the main loop of the installation software in accordance with the present invention.
Figure 5:
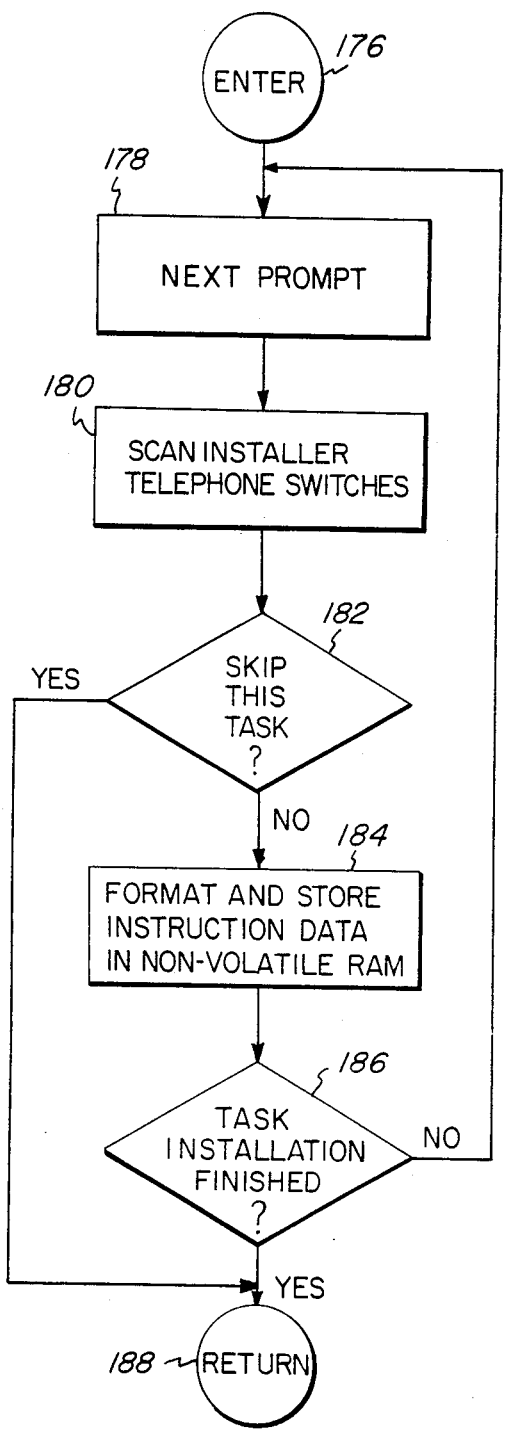
FIG. 5 is a simplified flow chart showing an install task routine of the type which is called by the main installation loop of FIG. 4.

In order to explain the installation procedure, the flow charts of FIGS. 4 and 5 are provided. FIG. 4 is a flow chart for a main installation loop. The program depicted by the flow chart is resident in software contained in telephone system microcomputer 10. Those skilled in the art will appreciate that the installation software is called from ROM in microcomputer 10 upon commencement of the installation mode of operation.

After entering the main installation loop at box 160, control passes to box 162 where the opening of contacts 4 in installer's switch 18 is detected. If the switch has not been actuated to open contacts 4, control is passed to box 164 and the loop ends. If installer switch 18 has been actuated, indicating that the key telephone system is to be programmed or reprogrammed, control passes to box 166 where the installation mode of operation is entered. At the same time, a counter (N) is initialized to the value "1". At box 168, task N is called. Task N is one of a plurality of routines which can be entered in order to program certain features of the key telephone system. Generally, a separate routine will be provided for each different feature which is programmable in the key telephone system. As noted above, there are many such programmable features which could be provided in a key telephone system. Those skilled in the art will recognize that those features set forth above, as well as many others, could be provided in such a system.

The flow chart of FIG. 5 depicts a generic "install task routine" which outlines, in simplified form, the manner in which programming of each separate feature or task can be accomplished. When a task is called at box 168 in FIG. 4, control passes to the software routine for that particular task. The task routine is entered at box 176, as shown in FIG. 5, which passes control to box 178 where the "next prompt" is displayed on installer's display 14 and, if applicable, on the indicator lamps of installer's telephone station 20. Thus, for example, if the task being programmed is to designate certain telephone stations within the key telephone system as "attendant" stations, installer's display 14 will, at box 178, be actuated to display the message "ATTENDANT". Then, the installer will press keys 66–81, as appropriate, to designate which telephone stations within the system are to be designated as attendant phones. When any of keys 66–80 are actuated, the associated LEDs 120–134 will start flashing to indicate that the corresponding telephone station has been designated as an attendant station.

Actuation of keys on installer's telephone 20 is detected at box 180, where all of the telephone switches on the installer's telephone are scanned. Actuation of one designated key, e.g., key 65 ("AU-DIAL") on installer's telephone station 20 will cause the install tasks to be stepped through sequentially. Thus, it is possible for a system programmer to skip over one or more categories of features by pressing the designated key. In such an instance, box 182 of FIG. 5 determines that the designated "skip" key has been pressed, and the task currently called should be skipped. In such event, control is passed to box 188 for return to box 168 of the main installation loop shown in FIG. 4. If the designated skip key has not been pressed, control will be passed from box 182 in FIG. 5 to box 184, and instruction data entered by the installer via telephone station 20, as determined by scanning of the telephone switches at box 180, will be formatted by microcomputer 10 and stored in non-volatile memory 12. Control then passes to box 186, and a determination is made as to whether the current programming task has been finished. If installation of the applicable feature(s) has not been finished, control is passed back to box 178 and the routine for the feature currently being programmed continues. Otherwise, control is passed to box 188 for return to the main installation loop of FIG. 4.

When an install task routine returns control back to box 168 of the main installation loop, a determination is subsequently made at box 170 as to whether the installer switch 18 is still actuated. If not, the installation mode of operation is terminated by ending the main installation loop at box 172. If, on the other hand, the installer switch 18 is still actuated, the install task counter "N" is incremented by one at box 174. Then, the next task is called at box 168. In this manner, the install task routines for every one of the features which can be programmed into the key telephone system will be accessed one at a time for programming by the installer. As noted above, if an installer wishes to skip one or more of the install task routines, a designated switch on telephone 20 can be actuated to sequentially access the next feature to be programmed.

It will now be appreciated that the present invention provides a key telephone system which is programmable using one of the telephones from the system as the data input terminal for the programming instructions. An alphanumeric display is used to prompt an installer through a sequence of steps designed to elicit instructions for programming system features. The program instructions entered by the system installer are stored as data in non-volatile memory.

A copy of the software which controls an exemplary embodiment of a programming routine in accordance with the present invention is appended hereto and made a part hereof as "Appendix B". The software is written in the language "C" and is configured to run on a Z-80 microprocessor.

APPENDIX A

DIAL PAD PROGRAM ENTRY CHOICES
PRESTIGE 516 PROGRAM RECORD SHEET 1 "G" "G" VERSION SOFTWARE DEC 9, 1983

| ACTION | DISPLAY MESSAGE | Digit 0 | Digit 1 | Digit 2 | Digit 3 | Digit 4 | |
|---|---|---|---|---|---|---|---|
| S1 POSITION 4 OPEN on STATION INTERFACE | 000 STATION TYPE | NONE | KEYSET # | I/COM | RCRDR | | #SYSTEM DEFAULT= ALL STATIONS ARE KEYSETS. IF STATIONS ARE NOT GOING TO BE INSTALLED ON CERTAIN CIRCUITS, THEY MUST BE PROGRAMMED AS "NONE" OTHERWISE THE CORRESPONDING LED WILL BE LIT ON ALL TELEPHONES IN THE SYSTEM. |
| Press DSS Key 1 | 001 SN 01=choice | | | | | | |
| Press DSS Key 2 | 002 SN 02=choice | | | | | | |
| Press DSS Key 3 | 003 SN 03=choice | | | | | | |
| Press DSS Key 4 | 004 SN 04=choice | | | | | | |
| Press DSS Key 5 | 005 SN 05=choice | | | | | | |
| Press DSS Key 6 | 006 SN 06=choice | | | | | | |
| Press DSS Key 7 | 007 SN 07=choice | | | | | | |
| Press DSS Key 8 | 008 SN 08=choice | | | | | | |
| Press DSS Key 9 | 009 SN 09=choice | | | | | | |
| Press DSS Key 10 | 010 SN 10=choice | | | | | | |
| Press DSS Key 11 | 011 SN 11=choice | | | | | | |
| Press DSS Key 12 | 012 SN 12=choice | | | | | | |
| Press DSS Key 13 | 013 SN 13=choice | | | | | | |
| Press DSS Key 14 | 014 SN 14=choice | | | | | | |
| Press DSS Key 15 | 015 SN 15=choice | | | | | | |
| Press DSS Key 16 | 016 SN 16=choice | | | | | | |
| PRESS AU DIAL KEY | 020 CO LINE TYPE | NONE | CO TRK # | X PAGE | RELAY | | #SYSTEM DEFAULT= ALL CIRCUITS ARE C.O. LINES |
| Press L-1 Key | 021 TR 01=choice | | | | | | |
| Press L-2 Key | 022 TR 02=choice | | | | | | |
| Press L-3 Key | 023 TR 03=choice | | | | | | |
| Press L-4 Key | 024 TR 04=choice | | | | | | |
| Press L-5 Key | 025 TR 05=choice | | | | | | |
| PRESS AU DIAL KEY | 030 TRRCL=choice | 15 SEC | 30 SEC # | 45 SEC | 60 SEC | | #SYSTEM DEFAULT= 30 SECOND TRANSFER RECALL |
| PRESS AU DIAL KEY | 031 HLDRCL=choice | NONE | 1 MIN | 2 MIN # | 3 MIN | 4 MIN | #SYSTEM DEFAULT= 2 MINUTE HOLD RECALL |
| PRESS AU DIAL KEY | 032 OPRCL=choice | 30 SEC # | 45 SEC | 60 SEC | 90 SEC | | #SYSTEM DEFAULT= 30 SECONDS OPERATOR RECALL |
| PRESS AU DIAL KEY | 033 MUS SRC=choice | NO # | YES | | | | #SYSTEM DEFAULT= NO MUSIC INPUT SOURCE |

PRESTIGE 516 PROGRAM RECORD SHEET 2 "G" "G" VERSION SOFTWARE JAN 3, 1984
DIAL PAD ENTRY CHOICES

| ACTION | DISPLAY MESSAGE | Digit 0 | Digit 1 | Digit 2 | Digit 3 | DIGIT 4 | DIGIT 5 | |
|---|---|---|---|---|---|---|---|---|
| PRESS AU DIAL KEY | 034 BG MUSIC= choice | NO # | YES | | | | | #SYSTEM DEFAULT= NO BACKGROUND MUSIC THROUGH PHONE SPKR |
| PRESS AU DIAL KEY | 035 RINGDOWN= choice | NO # | OK | | | | | #SYSTEM DEFAULT= VOICE ANNOUNCE W/HANDSFREE REPLY WHEN (system wide) CALLING SOMEONE ON INTERCOM VIA DSS |
| PRESS AU DIAL KEY | 036 CO HFREE= choice | NO # | YES | | | | | #SYSTEM DEFAULT= NO HANDSFREE C.O. CALLS ALLOWED. (requires SPEAKER PHONE CARD OPTION) |
| PRESS AU DIAL KEY | 037 ALL PG= choice | SOFT # | EXT | | | | | #SYSTEM DEFAULT= ALL CALL PAGE THROUGH PHONE SPEAKERS |
| PRESS AU DIAL KEY | 038 PULSE DIAL | 10PPS | 10PPS | 20PPS | 20PPS | 20PPS | 20PPS | #SYSTEM DEFAULT= 10 PULSES PER SECOND 60/40 RATIO |

-continued
APPENDIX A

| | | 60/40 | 67/33 | 70/30 | 60/40 | 67/33 | 70/30 | |
|---|---|---|---|---|---|---|---|---|
| PRESS AU DIAL KEY | 039 PG ZONES=choice | 1 | 2 | 3 # | | | | (This only applies to C.O. LINES programmed for PULSE see categories 101,201,301,401,501) #SYSTEM DEFAULT= 3 ZONES OF PAGING. (see categories 071 and 072 to assign stations to page groups) |
| PRESS AU DIAL KEY | 050 ATTENDANT | PRESS DSS KEYS FOR DESIRED STATIONS. FLASHING LEDs=ATTENDANT POSITIONS. # no attendants | | | | | | Attendants selected. STN 1-- STN 3-- STN 5-- STN 7-- STN10-- STN13-- STN16-- STN 2-- STN 4-- STN 6-- STN 8-- STN11-- STN14--=SYSTEM DEFAULT STN 9-- STN12-- STN15--=NO ATTENDANT |
| PRESS AU DIAL KEY | 060 PBX CODE=choice | 0 # | 1 | 2 | 3 | Digit 4 | Digit 5 | Digit 6 Digit 7 #SYSTEM DEFAULT= 0 PBX DIGITS ABSORBED (number of digits for PBX line access) |
| PRESS AU DIAL KEY | 061 PAUSE TM=choice (SEC) | 0 # | 1 | 2 | 3 # | 4 # | 5 | 6   7   #SYSTEM DEFAULT=3 SECOND DELAY FOR EACH PAUSE ENTERED DURING AUTO DIAL STORAGE |
| PRESS AU DIAL KEY | 062 MEM CLR=choice | NO # | YES | | | | | THIS FEATURE IS USED TO CLEAR OUT THE DATA BASE MEMORY CONTENTS TO DUMP ALL PREVIOUS ENTRIES. THE MANUAL RESET SWITCH MUST BE PRESSED TO ACTIVATE |
| PRESS AU DIAL KEY | 063 DEBUG=choice | NO # | YES | | | | | THIS FEATURE WILL BE UTILIZED WITH FUTURE SOFTWARE OPTIONS TO PERFORM DIAGNOSTICS. IT IS PLANNED AS AN OFF-LINE FUNCTION slows system operation |
| PRESS AU DIAL KEY | 071 SOFT PAGE GR | Select stations to be in PAGE GROUP 1. SAME PROCEDURE AS 50 ABOVE. FLASHING=PAGE GROUP 1 STATIONS. | | | | | | SOFT PG GP 1 stations; STN 1-- STN 3-- STN 5-- STN 7-- STN10-- STN13-- STN 2-- STN 4-- STN 6-- STN 8-- STN11-- STN14-- STN 9-- STN12-- STN15-- #SYSTEM DEFAULT= ALL STATIONS IN PAGE GROUP 1.(access by "PAGE" +Digit 1) NOTE D.B.MEMORY SWITCH MUST BE IN "NORMAL" POSITION FOR ACCESS |
| PRESS AU DIAL KEY | 072 SOFT PAGE GR | Select stations to be in PAGE GROUP 2. SAME PROCEDURE AS ABOVE. FLASHING=PAGE GROUP 2 STATIONS. | | | | | | SOFT PG GP 2 stations' STN 1-- STN 3-- STN 5-- STN 7-- STN10-- STN13-- STN14--=SYSTEM DEFAULT STN 2-- STN 4-- STN 6-- STN 8-- STN11-- STN15--= NO STATIONS STN 9-- STN12-- |

LINE 1 PROGRAMMING SECTION
(First digit DISPLAY indicates C.O. LINE number beging programmed)

| | | Digit 0 | Digit 1 | Digit 2 | Digit 3 | Digit 4 | Digit 5 | Digit 6 Digit 7 |
|---|---|---|---|---|---|---|---|---|
| PRESS AU DIAL KEY | 101 DIAL=choice | TONE # | PULSE | | | | | |
| PRESS AU DIAL KEY | 102 RING=choice | LIST # | EXT PAGE | LOUD RNG | | | | #SYSTEM DEFAULT= PHONES WHICH WILL RING ON LINE BEING PROGRAMMED WILL BE DETERMINED BY LIST OF STATIONS SELECTED .(see category 109) |
| PRESS AU DIAL KEY | 103 RLSE=choice (C.O. release) | 150MS | 200MS | 250MS | 300MS | 350MS | 400MS | 450MS 500MS #SYSTEM DEFAULT= OUTSIDE PARTY DISCONNECT ON HOLD MUST BE > 500MS # |

PRESTIGE 516 PROGRAM RECORD SHEET 3 "G" "G" VERSION SOFTWARE DEC 9, 1983
DIAL PAD ENTRY CHOICES

| ACTION | DISPLAY MESSAGE | Digit 0 | Digit 1 | Digit 2 | Digit 3 | Digit 4 | Digit 5 | Digit 6 Digit 3 | |
|---|---|---|---|---|---|---|---|---|---|
| PRESS AU DIAL KEY | 104 HSF=choice (C.O.flash time) | 750 MS | 1000MS | 1500MS # | 2000MS | | | | #SYSTEM DEFAULT=1500 MS "FEAT + FLASH HOOK SWITCH FLASH TIMING. |
| PRESS AU DIAL KEY | 105 NSV=choice | ANS MACH | RING GRP # | EXT PAGE | LOUD RNG | | | | #SYSTEM DEFAULT= PHONES PROGRAMMED IN CATEGORY 110 RING ON THIS LINE @ NITE |
| PRESS AU DIAL KEY | 106 ACCESS LINE | #System initializes with all stations able to access all C.O. LINES. All stations having access to the line being programmed, will have their DSS LED flashing. To restrict access, Press associated DSS KEY/s | | | | | | | C.O. LINE 1 ACCESS Stations STN 1-- STN 3-- STN 5-- STN 7-- STN10-- STN13-- STN16-- STN 2-- STN 4-- STN 6-- STN 8-- STN11-- STN14-- STN 9-- STN12-- STN15-- #SYSTEM DEFAULT= ALL STATIONS HAVE ACCESS TO ALL C.O. LINES. |

-continued
APPENDIX A

|  |  |  |
|---|---|---|
|  |  | for desired stations (the LED will light steadily). After all desired stations are selected. PRESS STORE KEY (* on dial pad). |
| PRESS AU DIAL KEY | 1∅7 OUTGOING USE | SAME PROCEDURE AS ABOVE. FLASHING = STATIONS ALLOWED TO ACCESS LINE BEING PROGRAMMED FOR OUTGOING C.O. CALLS. #all have outgoing use |
| PRESS AU DIAL KEY | 1∅8 INCOMING USE | SAME PROCEDURE AS ABOVE. FLASHING = STATIONS ALLOWED TO ACCESS LINE BEING PROGRAMMED FOR INCOMING C.O. CALLS. #all have incoming use |
| PRESS AU DIAL KEY | 1∅9 AUDIBLE RING | SAME PROCEDURE AS ABOVE. FLASHING = STATIONS WHICH WILL RING FOR INCOMING CALLS ON C.O. LINE BEING PROGRAMMED. #all ring |
| PRESS AU DIAL KEY | 11∅ NITE RING GR | SAME PROCEDURE AS ABOVE. FLASHING = STATIONS WHICH WILL RING WHEN SYSTEM IS IN NIGHT SERVICE. #all stations ring |
| PRESS AU DIAL KEY | 111 AUTO SELECT (Prime line) only one line per stn(see 111) | SAME PROCEDURE AS ABOVE. FLASHING = STATIONS WHICH HAVE AUTO SELECT FOR LINE BEING PROGRAMMED. #no stations have auto select |

|  |  |  |  |
|---|---|---|---|
|  | OUTGOING LINE 1 Stations' |  |  |
|  | STN 1--- | STN 3--- | STN 5--- | STN 7--- | STN1∅--- | STN13--- STN16--- |
|  | STN 2--- | STN 4--- | STN 6--- | STN 8--- | STN11--- | STN14--- |
|  |  |  | STN 9--- | STN12--- | STN15--- |
|  | #SYSTEM DEFAULT = ALL STATIONS HAVE OUTGOING ACCESS |
|  | INCOMING LINE 1 Stations' |
|  | STN 1--- | STN 3--- | STN 5--- | STN 7--- | STN1∅--- | STN13--- STN16--- |
|  | STN 2--- | STN 4--- | STN 6--- | STN 8--- | STN11--- | STN14--- |
|  |  |  | STN 9--- | STN12--- | STN15--- |
|  | #SYSTEM DEFAULT = ALL STATIONS HAVE INCOMING ACCESS |
|  | LINE 1 AUDIBLE RING Stations' |
|  | STN 1--- | STN 3--- | STN 5--- | STN 7--- | STN1∅--- | STN13--- STN16 |
|  | STN 2--- | STN 4--- | STN 6--- | STN 8--- | STN11--- | STN14--- |
|  |  |  | STN 9--- | STN12--- | STN15--- |
|  | #SYSTEM DEFAULT = ALL STATIONS RING |
|  | NIGHT RING GROUP Stations' |
|  | STN 1--- | STN 3--- | STN 5--- | STN 7--- | STN1∅--- | STN13--- STN16--- |
|  | STN 2--- | STN 4--- | STN 6--- | STN 8--- | STN11--- | STN14--- |
|  |  |  | STN 9--- | STN12--- | STN15--- |
|  | #SYSTEM DEFAULT = ALL STATIONS RING WHEN ATTENDANT PRESESS "FEAT + DND" |
|  | AUTO-SELECT LINE 1 Stations' |
|  | STN 1--- | STN 3--- | STN 5--- | STN 7--- | STN1∅--- | STN13--- STN16--- |
|  | STN 2--- | STN 4--- | STN 6--- |  STN 8--- | STN11--- | STN14--- |
|  |  |  |  | STN 9--- | STN12--- | STN15--- |

PRESTIGE 516 PROGRAM RECORD SHEET 4"G" "G" VERSION SOFTWARE DEC 9, 1983

THE PROGRAM CATEGORIES LISTED ABOVE (1∅1-111) ARE REPEATED FOR EACH OF THE FOUR REMAINING C.O. LINES. THE FIRST DIGIT OF THE DISPLAY WILL CHANGE ACCORDINGLY TO INDICATE WHICH LINE IS CURRENTLY BEING PROGRAMMED FOR THE 11 CATEGORIES(indicated by the second and third digits of the display).
THESE CATEGORIES CAN BE SEQUENTIALLY ACCESSED BY CONTINUING TO PRESS THE AU DIAL KEY, OR CAN BE DIRECTLY JUMPED TO BY THE USE OF THE "SPLIT" BUTTON ON THE LEFT BOTTON ROW OF THE PROGRAMMING TELEPHONE. SEE SPLIT KEY FUNCTION IN PROGRAMMING SECTION OF THE MANUAL FOR MORE DETAIL.

| LINE 2 CATEGORIES | LINE 3 CATEGORIES | LINE 4 CATEGORIES | LINE 5 CATEGORIES |
|---|---|---|---|
| 2∅1 DIAL=--- | 3∅1 DIAL=--- | 4∅1 DIAL=--- | 5∅1 DIAL=--- |
| 2∅2 RING=--- | 3∅2 RING=--- | 4∅2 RING=--- | 5∅2 RING=--- |
| 2∅3 RLSE=--- | 3∅3 RLSE=--- | 4∅3 RLSE=--- | 5∅3 RLSE=--- |
| 2∅4 HSF=--- | 3∅4 HSF=--- | 4∅4 HSF=--- | 5∅4 HSF=--- |
| 2∅5 NSV=--- | 3∅5 NSV=--- | 4∅5 NSV=--- | 5∅5 NSV=--- |
| 2∅6 ACCESS LINE | 3∅6 ACCESS LINE | 4∅6 ACCESS LINE | 5∅6 ACCESS LINE |
| STN 1--- STN 9--- | STN 1--- STN 9--- | STN 1--- STN 9--- | STN 1--- STN 9--- |
| STN 2--- STN1∅--- | STN 2--- STN1∅--- | STN 2--- STN1∅--- | STN 2--- STN1∅--- |
| STN 3--- STN11--- | STN 3--- STN11--- | STN 3--- STN11--- | STN 3--- STN11--- |
| STN 4--- STN12--- | STN 4--- STN12--- | STN 4--- STN12--- | STN 4--- STN12--- |
| STN 5--- STN13--- | STN 5--- STN13--- | STN 5--- STN13--- | STN 5--- STN13--- |
| STN 6--- STN14--- | STN 6--- STN14--- | STN 6--- STN14--- | STN 6--- STN14--- |
| STN 7--- STN15--- | STN 7--- STN15--- | STN 7--- STN15--- | STN 7--- STN15--- |
| STN 8--- STN16--- | STN 8--- STN16--- | STN 8--- STN16--- | STN 8--- STN16--- |
| 2∅7 OUTGOING USE | 3∅7 OUTGOING USE | 4∅7 OUTGOING USE | 5∅7 OUTGOING USE |

| 21∅ NITE RING GR | 31∅ NITE RING GR | 41∅ NITE RING GR | 51∅ NITE RING GR |
|---|---|---|---|
| STN 1--- STN 9--- | STN 1--- STN 9--- | STN 1--- STN 9--- | STN 1--- STN 9--- |
| STN 2--- STN1∅--- | STN 2--- STN1∅--- | STN 2--- STN1∅--- | STN 2--- STN1∅--- |
| STN 3--- STN11--- | STN 3--- STN11--- | STN 3--- STN11--- | STN 3--- STN11--- |
| STN 4--- STN12--- | STN 4--- STN12--- | STN 4--- STN12--- | STN 4--- STN12--- |
| STN 5--- STN13--- | STN 5--- STN13--- | STN 5--- STN13--- | STN 5--- STN13--- |
| STN 6--- STN14--- | STN 6--- STN14--- | STN 6--- STN14--- | STN 6--- STN14--- |
| STN 7--- STN15--- | STN 7--- STN15--- | STN 7--- STN15--- |  |
| STN 8--- STN16--- | STN 8--- STN16--- | STN 8--- STN16--- |  |
| 211 AUTO SELECT | 311 AUTO SELECT | 411 AUTO SELECT | 511 AUTO SELECT |
| STN 1--- STN 9--- | STN 1--- STN 9--- | STN 1--- STN 9--- | STN 1--- STN 9--- |
| STN 2--- STN1∅--- | STN 2--- STN1∅--- | STN 2--- STN1∅--- | STN 2--- STN1∅--- |
| STN 3--- STN11--- | STN 3--- STN11--- | STN 3--- STN11--- | STN 3--- STN11--- |
| STN 4--- STN12--- | STN 4--- STN12--- | STN 4--- STN12--- | STN 4--- STN12--- |
| STN 5--- STN13--- | STN 5--- STN13--- | STN 5--- STN13--- | STN 5--- STN13--- |
| STN 6--- STN14--- | STN 6--- STN14--- | STN 6--- STN14--- | STN 6--- STN14--- |

APPENDIX A -continued

| | | | | | | | | |
|---|---|---|---|---|---|---|---|---|
| STN 1- | STN 9- | STN 1- | STN 9- | STN 1- | STN 9- | STN 1- | STN 7- | STN15- |
| STN 2- | STN10- | STN 2- | STN10- | STN 2- | STN10- | STN 2- | STN 8- | STN16- |
| STN 3- | STN11- | STN 3- | STN11- | STN 3- | STN11- | | | |
| STN 4- | STN12- | STN 4- | STN12- | STN 4- | STN12- | | | |
| STN 5- | STN13- | STN 5- | STN13- | STN 5- | STN13- | | | |
| STN 6- | STN14- | STN 6- | STN14- | STN 6- | STN14- | | | |
| STN 7- | STN15- | STN 7- | STN15- | STN 7- | STN15- | | | |
| STN 8- | STN16- | STN 8- | STN16- | STN 8- | STN16- | | | |
| 208 INCOMING USE | | 308 INCOMING USE | | 408 INCOMING USE | | 508 INCOMING USE | | |
| STN 1- | STN 9- | STN 1- | STN 9- | STN 1- | STN 9- | | | |
| STN 2- | STN10- | STN 2- | STN10- | STN 2- | STN10- | | | |
| STN 3- | STN11- | STN 3- | STN11- | STN 3- | STN11- | | | |
| STN 4- | STN12- | STN 4- | STN12- | STN 4- | STN12- | | | |
| STN 5- | STN13- | STN 5- | STN13- | STN 5- | STN13- | | | |
| STN 6- | STN14- | STN 6- | STN14- | STN 6- | STN14- | | | |
| STN 7- | STN15- | STN 7- | STN15- | STN 7- | STN15- | | | |
| STN 8- | STN16- | STN 8- | STN16- | STN 8- | STN16- | | | |
| 209 AUDIBLE RING | | 309 AUDIBLE RING | | 409 AUDIBLE RING | | 509 AUDIBLE RING | | |
| STN 1- | STN 9- | STN 1- | STN 9- | STN 1- | STN 9- | | | |
| STN 2- | STN10- | STN 2- | STN10- | STN 2- | STN10- | | | |
| STN 3- | STN11- | STN 3- | STN11- | STN 3- | STN11- | | | |
| STN 4- | STN12- | STN 4- | STN12- | STN 4- | STN12- | | | |
| STN 5- | STN13- | STN 5- | STN13- | STN 5- | STN13- | | | |
| STN 6- | STN14- | STN 6- | STN14- | STN 6- | STN14- | | | |
| STN 7- | STN15- | STN 7- | STN15- | STN 7- | STN15- | | | |
| STN 8- | STN16- | STN 8- | STN16- | STN 8- | STN16- | | | |

PRESTIGE 516 PROGRAM RECORD SHEET 5 "G" "G" VERSION SOFTWARE DEC 9, 1983

| ACTION | DISPLAY MESSAGE | | | |
|---|---|---|---|---|
| | 900 STN DIAL RST | TO BE DEFINED | | |
| PRESS AU DIAL KEY | 931 CALL WT TONE (Must be prog as ATTENDANT to function) | SAME PROCEDURE AS CATEGORY 106. FLASHING=STATIONS WHICH WILL RECEIVE A CALL WAITING TONE IN THEIR HANDSET WHILE ENGAGED ON A C.O. CALL AND ANOTHER CALL IS TRANSFERED TO THEM. | CALL WAIT TONE Stations' STN 1- STN 3- STN 5- STN 7- STN10- STN13- STN15- STN 2- STN 4- STN 6- STN 8- STN11- STN14- STN16- STN 9- STN12- | |
| PRESS AU DIAL KEY | 932 SEND PAGE | SAME PROCEDURE AS ABOVE. FLASHING= STATIONS ALLOWED TO ACCESS PAGE CIRCUIT. | SEND PAGE ENABLE Stations' STN 1- STN 3- STN 5- STN 7- STN10- STN13- STN15- STN 2- STN 4- STN 6- STN 8- STN11- STN14- STN16- STN 9- STN12- | |
| PRESS AU DIAL DEY | 933 REFUSE PAGE | SAME PROCEDURE AS ABOVE. FLASHING= STATIONS WHICH WILL NOT RECEIVE PAGE ANNOUNCEMENTS THROUGH THE SPEAKER IN THEIR PHONE. | REFUSE PAGE Stations' STN 1- STN 3- STN 5- STN 7- STN10- STN13- STN15- STN 2- STN 4- STN 6- STN 8- STN11- STN14- STN16- STN 9- STN12- | |
| PRESS AU DIAL KEY | 934 BARGEIN ORIG (executive override) | SAME PROCEDURE AS ABOVE. FLASHING= STATIONS WHICH ARE ALLOWED TO BARGE INTO CALLS IN PROGRESS AT OTHER PHONES AFTER WARNING TONE (if the called station is not Programmed to deny barge in). | BARGE IN ORIGINATE Stations' STN 1- STN 3- STN 5- STN 7- STN10- STN13- STN15- STN 2- STN 4- STN 6- STN 8- STN11- STN14- STN16- STN 9- STN12- | |
| PRESS AU DIAL KEY | 935 BARGEIN DENY | SAME PROCEDURE AS ABOVE. FLASHING= STATIONS WHICH WILL NOT ALLOW BARGE IN TO THEIR PHONE. | BARGE IN DENY Stations' STN 1- STN 3- STN 5- STN 7- STN10- STN13- STN15- STN 2- STN 4- STN 6- STN 8- STN11- STN14- STN16- STN 9- STN12- | |

-continued

APPENDIX A

| ACTION | DISPLAY MESSAGE | | | | | | | |
|---|---|---|---|---|---|---|---|---|
| PRESS AU DIAL KEY | 936 HARD OF HRNG | SAME PROCEDURE AS ABOVE. FLASHING= STATIONS SELECTED AS HARD OF HEARING. Level set for Previous call is stored for each subsequent call. May be manually changed by volume control at Phone. | HARD OF HEARING Stations' STN 1- - - STN 3- - - STN 5- - - STN 2- - - STN 4- - - STN 6- - - | | | STN 7- - - STN 8- - - STN 9- - - | STN10- - - STN13- - - STN16- - - STN11- - - STN14- - - STN12- - - STN15- - - |
| PRESS AU DIAL KEY | 937 AUT RING SEL | SAME PROCEDURE AS ABOVE. FLASHING= STATIONS WHICH WILL AUTO SELECT RINGING C.O. LINES WHEN GOING OFF-HOOK. | AUT RING SELECT Stations' STN 1- - - STN 3- - - STN 5- - - STN 2- - - STN 4- - - STN 6- - - | | | STN 7- - - STN 8- - - STN 9- - - | STN10- - - STN13- - - STN16- - - STN11- - - STN14- - - STN12- - - STN15- - - |
| PRESS AU DIAL KEY | 938 I/C RINGDOWN | SAME PROCEDURE AS ABOVE. STEADY= STATIONS WHICH WHEN CALLED ON THE INTERCOM VIA DSS KEY, WILL RECEIVE RINGING INSTEAD OF VOICE. THEY MUST GO OFF-HOOK AND PRESS DSS KEY (flashing) TO ANSWER THE CALL. #none ringdown | INTERCOM RING DOWN Stations' STN 1- - - STN 3- - - STN 5- - - STN 2- - - STN 4- - - STN 6- - - | | | STN 7- - - STN 8- - - STN 9- - - | STN10- - - STN13- - - STN16- - - STN11- - - STN14- - - STN12- - - STN15- - - |

PRESTIGE 516 PROGRAM RECORD SHEET 6"G" "G" VERSION SOFTWARE DEC 9, 1983

| ACTION | DISPLAY MESSAGE | | | | | | | |
|---|---|---|---|---|---|---|---|---|
| PRESS AU DIAL KEY | 939 HANDSFREE OK | SAME PROCEDURE AS ABOVE. FLASHING= STATIONS ALLOWED TO ORIGINATE CALLS HANDSFREE. (allows installer to enable or disable individual stations for use of speaker phone option if installed) *HIGH AMBIENT NOISE AREAS SHOULD BE DISABLED. | HANDSFREE ORIGINATE Stations' STN 1- - - STN 3- - - STN 5- - - STN 2- - - STN 4- - - STN 6- - - | | | STN 7- - - STN 8- - - STN 9- - - | STN10- - - STN13- - - STN16- - - STN11- - - STN14- - - STN12- - - STN15- - - |
| PRESS AU DIAL KEY | 940 AUTO SELECT (selects first available non-used CO line) | SAME PROCEDURE AS ABOVE. FLASHING= STATIONS SELECTED FOR AUTO SELECT. (when a station user goes off-hook, they will select available C.O. LINE unless another LINE KEY or DSS KEY is selected first) | C.O. LINE AUTO SELECT Stations' STN 1- - - STN 3- - - STN 5- - - STN 2- - - STN 4- - - STN 6- - - | | | STN 7- - - STN 8- - - STN 9- - - | STN10- - - STN13- - - STN16- - - STN11- - - STN14- - - STN12- - - STN15- - - |

APPENDIX B

Jan 20 12:19 1984  admin.c Page 1                  © 1984 PKS/COMMUNICATIONS INC.

```c
/*% zc -c -x14 -DZC -I$INCLUDE %
 */
#include (queue.h)
#include (dev.h)
#include (conf.h)
#include (types.h)
#include (clock.h)
#include (stnio.h)
#include (mdmsg.h)
#include (admin.h)
#include (conn.h)
#include (call.h)
#include (keys.h)
#include (install.h)

extern  stn_t   *stntab[];
#ifdef ZC
static  admsg_t *ad = 0;
static  byte    curmin = 0;
#else
static  admsg_t *ad;
static  byte    curmin;
endif admin( msg )
        msg_t   *msg;
        {
        static byte     input, dev, type;
        extern char     ad_brd;
        extern char     db_cl;
        extern byte     ledarr[PC_STNS+PC_TRUNKS][PC_STNS];
        extern byte     outsvc[];

ad = (admsg_t *)msg;
        type = ad->ad_type;
        input = ad->ad_input[0];
        dev = ad->ad_dev;

if( type == IOTHER )
                {
                static  byte    sn;
                static  stn_t   *stn;

if( input != ad_brd )
                        {
                        ad_brd = input;
                        if (ad_brd&AF_INST)     /* installer switch closed */
                                {
                                for (sn = 15;  sn>7
                                        && ((stn=stntab[sn])==NULL_STN
                                        || stn->s_st==ST_OSV);
                                        --sn)
                                        ;
                                if (sn!=7)
                                        sn = 15;
                                insinit(sn);
```

```
Jan 20 12:19 1984  admin.c Page 2 if (stntab[sn] == NULL_STN )
                                        install(sn, INS_MENU);
                                }
                        else
                                {
                                insexit(sn);
                                if ((stn=stntab[sn]) != NULL_STN &&
                                                        stn->s_st == ST_INST)
                                        {
                                        stn->s_st = ST_IDLE;
                                        stnstat( stn, 0 );
                                        ledlinit();
                                        }
                                }
                if( ad_brd&AF_INST )
                        if( (stn=stntab[sn])!=NULL_STN && stn->s_st==ST_IDLE )
                                {
                                static byte    *l;

stn->s_st = ST_INST;
                                stnstat( stn, LED_STDY );
                                l = (byte *)ledarr + sn;
                                for( dev=0; dev<(PC_STNS+PC_TRUNKS);
                                                        dev++, l+=PC_STNS )
                                        *l = NOT_LN;
                                install(sn, INS_MENU);
                                }
                        else
                                ;
                else
                        if( ad->ad_input[4] != curmin )
                                timedisp();
                ad->ad_type = ADBOARD;
                sched( ADMIN, ad, 1, SECONDS );
                return;
                }
        else if( type == ADBOARD )
                otheri();
        else if( type == ADINST )
                {
                if (input<=K_ERROR && input!=K_HOOKSW)
                        install(dev, input);
                }
        else if( type == ADERROR )
                {
                fip( outsvc, 16 );
                insfn = INS_MENU;
                insmenu = M_STYP;
                }
        else if( type == ADINIT )
                install(dev, INS_MENU);
        free( (char *)ad );
        } byte revision[] = "GAX 00-XXX 00:00";
```

Jan 20 12:19 1984 admin.c Page 3

```c
byte montab[12][4] = { "JAN", "FEB", "MAR", "APR", "MAY", "JUN", "JUL", "AUG",
        "SEP", "OCT", "NOV", "DEC" };

timedisp()
        {
        static byte     *p;
        static byte     buf[17];
        extern conf_t   conf;
        static byte     digits[] = "0123456789ABCDEF";

p = &ad->ad_input[0];
        curmin = p[4];
        copyb( buf, revision, sizeof(revision) );
        buf[11] != p[7]&0x0F;           /* convert to Ascii HH:MM */
        buf[12] != p[6]&0x0F;
        buf[14] != p[5]&0x0F;
        buf[15] != p[4]&0x0F;
        buf[2] = digits[conf.cf_boot&0xF];       /* reboot count */
        copyb( &buf[7], montab[(p[12]&0x0F)*10+(p[11]&0x0F)-1], 3 );
        buf[4] != p[9]&0x0F;            /* day of the month */
        buf[5] != p[8]&0x0F;

fip( buf, 16 );
        }
```

Jan 19 17:30 1984 install.c Page 1

```c
/*% zc -c -DZC -I$INCLUDE -x14 %
** Handle installer dialogue.  NOTE TENNANT, CALL PICKUP, and DISTRIBUTION
*                               GROUP MENUS have been TEMPORARILY DISABLED
*/ include <install.h> menu_t  insmenu
ifdef  ZC
                = {}
endif
        ;
ledv_t  lineled[NO_BTNS]
#ifdef  ZC
                = {}
endif
        ;
val_t   insval
#ifdef  ZC
                = {}
endif
        ;
key_t   inskey
#ifdef  ZC
                = {}
endif
        ;
key_t   insfn
#ifdef  ZC
                = {}
endif
        ;
```

```
ledv_t   fnled
#ifdef   ZC
                  = {}
endif
         ;
static   char     insincr
#ifdef   ZC
                  = {}
endif
         ;

byte outsvc[]  = ' INST OUT OF SVC';

insinit(dev)
dev_t    dev;
         {
         insfn = INS_MENU;
         insmenu = M_STYP;
         fip(' INSTALLER MODE ', 16);
         } insexit(dev)
dev_t    dev;
         {
```

Jan 19 17:30 1984   install.c Page 2

```
         extern   byte     *stnbtns[];
         static   byte     *btns;
         static   lineT    line;
         static   stn_t    *instn;

instn = stntab[insdev = dev];
         btns = stnbtns[insdev];
         for (line = 0;  line < NO_BTNS;  ++line)
                  {
                  static   byte     lno;
                  static   ledv_t   led;
                  static   trunk_t  *t;
                  static   stn_t    *stn;

led = LED_OFF;
                  if ((lno=btns[line]) != NOT_LN)
                           {
                           if (lno&BT_TRK)
                                    {
                                    if ((t=trktab[lno&(BT_TRK-1)]) != NULL_TRUNK
                                                               && busytrk(t))
                                             if( tstat(t) == TR_RING )
                                                     led = LED_SLOW;
                                             else if( onhold( instn, t ) )
                                                     led = LED_WINK;
                                             else
                                                     led = LED_STDY;
                                    }
                           else if( (stn=stntab[lno]) != NULL_STN &&
                                        stn->s_ident==ID_STN && busystn(stn) )
                                    led = (stn->s_st == ST_DND) ? LED_CONT_FLUT :
                                                                  LED_STDY;
                           }
                  lineled[line] = led;
                  }
         lnupdate();
```

```
            timedisp();
        } install(dev, input)
dev_t   dev;
key_t   input;
        {
        static  byte    digits; /* outstanding count for jump command */ insdev = dev;  inskey = input;
        if (inskey == INS_JUMP)
                {
                insmenu = 0;  insincr = 1;
                if (insfn != INS_MENU)
                        light(insdev, fnled, LED_OFF);
                insfn = inskey;
                light(insdev, fnled=JUMP_LED, LED_STDY);
                jumpdisp(digits=3);
                }
        else if (digits != 0)
```

Jan 19 17:30 1984   install.c Page 3

```
                {
                if (bclass[inskey]==KC_DIGIT && (insval=dlbtn[input])<=10)
                        { if (insval==10) insval = 0; }
                else
                        { complain(); return; }
                insmenu = insmenu*10 + insval;
                jumpdisp(--digits);
                if (digits == 0)
                        newmenu();
                }
        else if (inskey == INS_PREV)
                {
                prvmenu();
                if (insmenu != 0)
                        insmenu += insincr = -1;
                newmenu();
                }
        else if (inskey == INS_NEXT)
                {
                if (insmenu <= M_STYP+PC_STNS)
                        insmenu = M_STYP+PC_STNS;
                else if (M_TTYP <= insmenu && insmenu <= M_TTYP+PC_TRUNKS)
                        insmenu = M_TTYP+PC_TRUNKS;
                else if (M_SDR <= insmenu && insmenu <= M_SDR+PC_STNS)
                        insmenu = M_SDR+PC_STNS;
                insmenu += insincr = 1;
                newmenu();
                }
        else
                domenu();
        } static
newmenu()
        {
        if (insfn != INS_MENU)
                light(insdev, fnled, LED_OFF);
        inskey = insfn = INS_MENU;
        domenu();
        }
```

```
static
domenu()
        {
        for (;;) {
                if (M_STYP <= insmenu && insmenu <= M_STYP+PC_STNS
                !! M_TTYP <= insmenu && insmenu <= M_TTYP+PC_TRUNKS
                !! M_SDR  <= insmenu && insmenu <= M_SDR+PC_STNS)
                        pgmtype();
                /* else if (nv_present
                &&      M_TNNT <= insmenu && insmenu < M_TNNT+MN_TNNT)
                        pgmtnnt(); */
                else if (nv_present
                &&      (M_SFPG < insmenu && insmenu <= M_SFPG+MN_SFPG
                /* !! M_PKUP < insmenu && insmenu <= M_PKUP+MN_PKUP
                   !!   M_APPR < insmenu && insmenu <= M_APPR+MN_APPR */))
```

Jan 19 17:30 1984   install.c Page 4

```
                        pgmgrps();
                else if (M_SYS  <= insmenu && insmenu < M_SYS+MN_SYS
                !!       M_OSYS <= insmenu && insmenu < M_OSYS+MN_OSYS
                !!       M_T1 < insmenu && insmenu < M_T1+MN_T
                !!       M_T2 < insmenu && insmenu < M_T2+MN_T
                !!       M_T3 < insmenu && insmenu < M_T3+MN_T
                !!       M_T4 < insmenu && insmenu < M_T4+MN_T
                !!       M_T5 < insmenu && insmenu < M_T5+MN_T)
                        pgmstrk();
                else if (M_TS1 <= insmenu && insmenu < M_T1+MN_TS
                !!       M_TS2 <= insmenu && insmenu < M_T2+MN_TS
                !!       M_TS3 <= insmenu && insmenu < M_T3+MN_TS
                !!       M_TS4 <= insmenu && insmenu < M_T4+MN_TS
                !!       M_TS5 <= insmenu && insmenu < M_T5+MN_TS
                !!       insmenu == M_OHS)
                        pgmtsn();
                else if (insmenu == M_ATTN
                !!       M_STN < insmenu && insmenu < M_STN+MN_STN)
                        pgmstn();
                else
                        {
                        if ((insmenu+=insincr) >= M_MAX)
                                insmenu = M_STYP;
                        if (insincr < 0)
                                prvmenu();
                        continue;
                        }
                break;
                }
        } static
jumpdisp(digits)
byte    digits;
        {
        static  char    buf[13];
        static  char    *bp;
        static  char    d;

bp = &buf[0];
        if (digits < 3) for (d = 2, d = d-digits;  d >= 0;  --d)
                *bp++ = insmenu/power10[d]%10 + '0';
        for (d = 0;  d < digits;  ++d)
                *bp++ = '_';
        strcpy(bp, " SELECTED");
        fip(buf, 12);
        }
```

```
static
prvmenu()
        {
        if (insmenu <= M_STYP+PC_STNS)
                insmenu = M_STYP;
        else if (M_TTYP <= insmenu && insmenu <= M_TTYP+PC_TRUNKS)
                insmenu = M_TTYP;
        else if (M_SDR <= insmenu && insmenu <= M_SDR+PC_STNS)
```

Jan 19 17:30 1984 install.c Page 5

```
                insmenu = M_SDR;
        }
```

Dec 12 11:05 1983  pgmisc.c Page 1

```
/*% zc -c -DZC -I$INCLUDE -x14 %
** Installer dialogue: miscellany
*/ include <install.h> byte    power10[] = { 1, 10, 100 };

static  char    buf[17]
#ifdef  ZC
                = {}
endif
        ;

static
bufmenu()
        {
        buf[0] = insmenu/100 + '0';
        buf[1] = insmenu/10%10 + '0';
        buf[2] = insmenu%10 + '0';
        buf[3] = ' ';
        } display(str)
char    *str;
        {
        bufmenu();
        strcpy (&buf[4], str);
        fip(buf, strlen(buf));
        } disptwo(str1, str2)
char    *str1;
char    *str2;
        {
        bufmenu();
        strcpy(&buf[4], str1);
        strcat(buf, str2);
        fip(buf, strlen(buf));
        }
```

```
lnlight(line, led)
lineT   line;
ledv_t  led;
        {
        if (line != NOT_LN)
                {
                lineled[line] = led;
                light( insdev, line, led );
                }
        } static  lineT   *lp
ifdef  ZC
                = {}
endif
```

Dec 12 11:05 1983 pgmisc.c Page 2

```
        ;
lnupdate()
        {
        static  byte    *rfps;
        extern  byte    stnindx[];
        extern  stnrfr_t        *stnrfps[];

stnindx[(insdev&8)))3] = 0;
        rfps = ((byte *)stnrfps[0]+insdev);
        for (lp = lineled; lp ( &lineled[NO_BTNS]; rfps += PC_STNS)
                *rfps = *lp++;
        } lnreset()
        { for (lp = &lineled[NO_BTNS];  lp != lineled;)
                *--lp = LED_OFF;
        lnupdate();
        } complain()
        {
        tone(insdev, TONE_BURST);
        } confirm()
        {
        tone(insdev, TONE_R3);
        if (nv_present)
                tone(insdev, TONE_R3);
        } stncopy(dststn, srcstn)
byte    dststn;
byte    srcstn;
        {
        static  nvstn_t *sp;

stcpy((nvstn_t*)&stnarr[dststn], sp = &stnarr[srcstn]);
        stcpy(nv_sttab[dststn], sp);
        }
```

```
static
stcpy(dp, sp)
nvstn_t *sp, *dp;
        {
        static byte    no, port;

no = dp->ns_no;  port = dp->ns_port;
        copyb((char*)dp, (char*)sp, sizeof(nvstn_t));
        dp->ns_no = no;  dp->ns_port = port;
        } stnxchg(dststn, srcstn)
```

Dec 12 11:05 1983  pgmisc.c Page 3

```
byte    dststn;
byte    srcstn;
        {
        static  stn_t    mystn;

bxchg(physstn, dststn, srcstn);
        bxchg(NVM->nv_pstn, dststn, srcstn);
        stcpy((nvstn_t*)&mystn, (nvstn_t*)&stnarr[dststn]);
        stncopy(dststn, srcstn);
        stcpy((nvstn_t*)&stnarr[srcstn], (nvstn_t*)&mystn);
        stcpy(nv_sttab[srcstn], (nvstn_t*)&mystn);
        if ((stntab[srcstn] = &stnarr[srcstn])->s_ident == ID_NONE)
                stntab[srcstn] = NULL_STN;
        if ((stntab[dststn] = &stnarr[dststn])->s_ident == ID_NONE)
                stntab[dststn] = NULL_STN;
        btninit();
        } trkcopy(dsttrk, srctrk)
byte    dsttrk;
byte    srctrk;
        {
        static  nvtrk_t *sp;

trcpy((nvtrk_t*)&trkarr[dsttrk], sp = &trkarr[srctrk]);
        trcpy(nv_trtab[dsttrk], sp);
        } static
trcpy(dp, sp)
nvtrk_t *dp;
nvtrk_t *sp;
        {
        static byte    pcdev, no, port;

no = dp->nt_no;  port = dp->nt_port;  pcdev = dp->nt_pdev;
        copyb((char*)dp, (char*)sp, sizeof(nvtrk_t));
        dp->nt_no = no;  dp->nt_port = port;  dp->nt_pdev = pcdev;
        copyb((char*)dp, (char*)sp, sizeof(nvtrk_t));
        }
```

```
trkxchg(dsttrk, srctrk)
byte    dsttrk;
byte    srctrk;
        {
        static  trunk_t mytrk;

bxchg(phystrk, dsttrk, srctrk);
        bxchg(NVM->nv_ptrk, dsttrk, srctrk);
        trcpy((nvtrk_t*)&mytrk, (nvtrk_t*)&trkarr[dsttrk]);
        trkcopy(dsttrk, srctrk);
        trcpy((nvtrk_t*)&trkarr[srctrk], (nvtrk_t*)&mytrk);
        trcpy(nv_trtab[srctrk], (nvtrk_t*)&mytrk);
        if ((trktab[srctrk] = &trkarr[srctrk])->t_ident == ID_NONE)
                trktab[srctrk] = NULL_STN;
        if ((trktab[dsttrk] = &trkarr[dsttrk])->t_ident == ID_NONE)
```

Dec 12 11:05 1983  pgmisc.c  Page 4

```
                trktab[dsttrk] = NULL_STN;
        btninit();
        } static
bxchg(bytes, dx, sx)
byte    bytes[];
byte    dx;
byte    sx;
        {
        static  byte    dst;

dst = bytes[dx];
        bytes[dx] = bytes[sx];
        bytes[sx] = dst;
        }
```

Dec  9 16:53 1983  pgmstn.c Page 1

```
/*% zc -c -I$INCLUDE -x14 %
** Installer dialogue: program station parameters
*/ include (install.h)

define ON      0x01            /* flag on by default */
#define OFF     0x00            /* flag off by default */
#define FLG     0x00            /* parameter in s_flags */
define CLS     0x02            /* parameter in s_class */ typedef struct bmenu_t {
        char    *m_hdr;
        byte    m_mask;
        byte    m_flag;
} bmenu_t;

static  bmenu_t atnmenu = {"ATTENDANT",    SF_OPER,   FLG!OFF};
static  bmenu_t cwtmenu = {"CALL WT TONE", SF_CWT,    FLG!ON };
static  bmenu_t pgxmenu = {"SEND PAGE",    SC_PAGE,   CLS!ON };
static  bmenu_t pgrmenu = {"REFUSE PAGE",  SF_RFPG,   FLG!OFF};
static  bmenu_t biomenu = {"BARGEIN ORIG", SF_BARGE,  FLG!OFF};
static  bmenu_t bibmenu = {"BARGEIN DENY", SF_RFBG,   FLG!OFF};
static  bmenu_t hdhmenu = {"HARD OF HRNG", SC_HHEAR,  CLS!OFF};
static  bmenu_t arsmenu = {"AUT RING SEL", SC_APCK,   CLS!OFF};
static  bmenu_t icrmenu = {"I/C RINGDOWN", SC_RXHF,   CLS!ON };
```

```
static  bmenu_t hfrmenu = {"HANDSFREE OK", SC_TXHF, CLS!ON };
static  bmenu_t acsmenu = {"AUTO CO SEL", SC_ACOS,  CLS!ON };

static  bmenu_t *menuvec[] = {&cwtmenu, &pgxmenu, &pgrmenu, &biomenu, &bibmenu,
                              &hdhmenu, &arsmenu, &icrmenu, &hfrmenu, &acsmenu
                              };

pgmstn()
    {
    static  lineT   line;
    static  bmenu_t *menuptr;
    static  ledv_t  led;
    static  stn_t   *stn, *nvstn;
    static  byte    val;
    static  lineT   stnno;

if (inskey == INS_MENU)
        {
        if (insmenu == M_ATTN)
            menuptr = &atnmenu;
        else
            menuptr = menuvec[insmenu-M_STN-1];
        display(menuptr->m_hdr);
        for (line = 0;  line < NO_BTNS;  ++line)
            if (line>=PC_STNS
                || (stn=stntab[physstn[line]]) == NULL_STN
                || stn->s_ident != ID_STN)
                    lineled[line] = LED_OFF;
            else
                {
```

```
                val     = menuptr->m_flag&CLS
                        ? stn->s_class
                        : stn->s_flags;
                lineled[line]   = menuptr->m_mask&val
                                ? LED_SLOW : LED_STDY;
                }
        lnupdate();
        }
    else if (bclass[inskey] == KC_LINE)
        {
        if ((led=lineled[line=dlbtn[inskey]]) == LED_OFF)
            complain();
        else if (led == LED_STDY)
            lnlight(line, LED_SLOW);
        else
            lnlight(line, LED_STDY);
        }
    else if (inskey == INS_DFLT)
        {
        for (line = 0;  line < NO_BTNS;  ++line)
            if (lineled[line] != LED_   )
                lineled[line]   = menuptr->m_flag&ON
                                ? LED_SLOW
                                : LED_STDY;
        lnupdate();
        }
    else if (inskey == INS_STORE)
        {
        for (line = 0;  line < PC_STNS;  ++line)
```

```
                {
                static byte      *sp, *nvp;

if( (stn=stntab[stnno=physstn[line]]) != NULL_STN )
                        {
                        nvstn = nv_sttab[stnno];
                        led = lineled[line];
                        val = menuptr->m_mask;
                        if (menuptr->m_flag&CLS)
                                {
                                nvp = &nvstn->s_class;
                                sp = &stn->s_class;
                                }
                        else
                                {
                                nvp = &nvstn->s_flags;
                                sp = &stn->s_flags;
                                }
                        if( led == LED_STDY )
                                *sp &= ~val;
                        else
                                *sp |= val;
                        *nvp = *sp;
                        }
                }
        confirm();
        }
``` ec  9 16:53 1983  pgmstn.c Page 3

```
        else
                complain();
        }
```

Jan 17 17:20 1984  pgmstr  Page 1

```
/*% zc -c -DZC -I$INCLUDE -x14 %
** Installer dialogue: program system and trunk parameters
*/ include <install.h>
include <test.h> typedef struct  vmenu_t {
        char    *m_hdr;
        int     (*m_get)();
        int     (*m_set)();
        byte    m_dflt;
        byte    m_vals;
        short   *m_val;
        char    **m_str;
} vmenu_t;

static  int     trcget(), trcset();
static  short   trval[] = {15, 30, 45, 60};
static  char    *tstr[] = {"15SEC", "30SEC", "45SEC", "60SEC"};
static  vmenu_t trcmenu = {"TR RCL=",  &trcget, &trcset,   4, trval, tstr};

static  int     hrcget(), hrcset();
static  short   hrval[] = {0, 60, 120, 180, 240};
```

```
static   char     *hstr[] = {"NONE", "1MIN", "2MIN", "3MIN", "4MIN"};
static   vmenu_t  hrcmenu = {"HLD RCL=", &hrcget, &hrcset, 2, 5, hrval, hstr};

static   int      orcget(), orcset();
static   short    orval[] = {30, 45, 60, 90};
static   char     *ostr[] = {"30SEC", "45SEC", "60SEC", "90SEC"};
static   vmenu_t  orcmenu = {"OP RCL=",  &orcget, &orcset, 0, 4, orval, ostr};

static   int      bitget(), bitset();
static   short    msval[] = {0, CF_MUSIC};
static   char     *mstr[] = {"NO", "YES"};
static   vmenu_t  mscmenu = {"MUS SRC=",&bitget, &bitset, 0, 2, msval, mstr};

static   short    bgval[] = {0, CF_BGM};
static   char     *bstr[] = {"NO", "YES"};
static   vmenu_t  bgmmenu = {"BG MUSIC=",&bitget, &bitset, 0, 2, bgval, bstr};

static   short    srval[] = {0, CF_SRDN};
static   char     *sstr[] = {"NO", "OK"};
static   vmenu_t  srdmenu = {"RINGDOWN=",&bitget, &bitset, 0, 2, srval, sstr};

static   short    chval[] = {0, CF_COHFREE};
static   char     *cstr[] = {"NO", "YES"};
static   vmenu_t  chfmenu = {"CO HFREE=",&bitget, &bitset, 0, 2, chval, cstr};

static   short    apval[] = {0, CF_XPG};
static   char     *apst[] = {"SOFT", "EXT"};
static   vmenu_t  apgmenu = {"ALL PG=",  &bitget, &bitset, 0, 2, apval, apst};

static   int      pzget(), pzset();
static   short    pzval[] = {1, 2, 3};
static   char     *pzstr[] = {"1", "2", "3"};

Jan 17 17:20 1984 pgmstrk.c Page 2 static   vmenu_t  pzmenu = {"PG ZONES=",  &pzget, &pzset, 2, 3, pzval, pzstr};

include <dial.h> static   int      codget(), codset();
static   short    cdval[] = {TF_1060, TF_1067, TF_1070,
                             TF_2060, TF_2067, TF_2070};
static   char     *cdst[] = {"10 PPS 60/40", "10 PPS 67/33", "10 PPS 70/30",
                             "20 PPS 60/40", "20 PPS 67/33", "20 PPS 70/30"};
static   vmenu_t  codmenu = {"",           &codget, &codset, 0, 6, cdval, cdst};

static   vmenu_t  *sysmenu[]={&trcmenu, &hrcmenu, &orcmenu, &mscmenu, &bgmmenu,
                              &srdmenu, &chfmenu, &apgmenu, &codmenu, &pzmenu};

static   int      pbxget(), pbxset();
static   short    pbxval[] = {0, 1, 2, 3, 4};
static   char     *pbxstr[] = {"0", "1", "2", "3", "4"};
static   vmenu_t  pbxmenu={"PBX CODE=",  &pbxget, &pbxset, 0, 5, pbxval, pbxstr};

static   int      pozget(), pozset();
static   short    pozval[] = {0, 1, 2, 3, 4, 5, 6, 7};
static   char     *pozstr[] = {"0", "1", "2", "3", "4", "5", "6", "7"};
static   vmenu_t  pozmenu={"PAUSE TM=",  &pozget, &pozset, 3, 8, pozval, pozstr};

static   int      memget(), memset();
static   short    memval[] = {0x5046, 0 };        /* "PF" and anything else */
static   char     *memstr[] = {"NO", "YES"};
static   vmenu_t  memmenu = {"MEM CLR=", &memget, &memset, 0, 2, memval, memstr};
```

```
static    int      dbgget(), dbgset();
static    short    dbgval[] = { 0, 1 };
static    char     *dbgstr[] = {"NO", "YES"};
static    vmenu_t  dbgmenu = {"DEBUG=",  &dbgget, &dbgset, 0, 2, dbgval, dbgstr};

static    int      tsget(), tsset();
static    short    tsval[] = { 0, TST_WANT_DTMF };
static    char     *tsstr[] = {"NONE", "START" };
static    vmenu_t  tsmenu = {"DIAG=",  &tsget, &tsset, 0, 2, tsval, tsstr};

static    int      cf2get(), cf2set();
static    short    abval[] = { 0, CF2_AUTBRG };
static    char     *abstr[] = {"NO", "YES" };
static    vmenu_t  abmenu = {"AUT BRG=",  &cf2get, &cf2set, 0, 2, abval, abstr};

static    vmenu_t  *osmenu[]={&pbxmenu, &pozmenu, &memmenu, &dbgmenu, &tsmenu,
                              &abmenu } static    int      sigget(), sigset();
static    short    sgval[] = {TF_DTMF, 0};
static    char     *sgst[] = {"TONE", "PULSE"};
static    vmenu_t  sigmenu = {"DIAL=",     &sigget, &sigset, 1, 2, sgval, sgst};

static    int      rngget(), rngset();
static    short    rnval[] = { NS_RNG, NS_PAGE, NS_LOUD };
static    char     *rstr[] = { "LIST", "EXT PAGE", "LOUD RNG"};
static    vmenu_t  rngmenu = { "RNG=", &rngget, &rngset, 0, 3, rnval, rstr};

Jan 17 17:20 1984  pgmste   Page 2
            trk.c include <clock.h> static    int      corget(), corset();
static    short    crval[] = {ticks(150), ticks(200), ticks(250), ticks(300),
                              ticks(350), ticks(400), ticks(450), ticks(500)};
static    char     *crst[] = {"150MS", "200MS", "250MS", "300MS",
                              "350MS", "400MS", "450MS", "500MS"};
static    vmenu_t  cormenu = {"RLSE=",    &corget, &corset, 7, 8, crval, crst};

static    int      hsfget(), hsfset();
static    short    hsval[] = {FL_750, FL_1000, FL_1500, FL_2000};
static    char     *hsst[] = {" 750MS", "1000MS", "1500MS", "2000MS"};
static    vmenu_t  hsfmenu = {"HSF=",     &hsfget, &hsfset, 2, 4, hsval, hsst};

static    int      nsvget(), nsvset();
static    short    nsval[] = {NS_ANSM, NS_RNG, NS_PAGE, NS_LOUD};
static    char     *nstr[] = {"ANS MACH", "RING GRP", "EXT PAGE", "LOUD RNG"};
static    vmenu_t  nsvmenu = {"NSV=",     &nsvget, &nsvset, 1, 4, nsval, nstr};

static    vmenu_t  *trkmenu[]={&sigmenu, &rngmenu, &cormenu, &   menu, &nsvmenu};

static    byte     trkno
#ifdef ZC
                   = {}
endif
                   ;
static    trunk_t  *trk
#ifdef ZC
                   = {}
endif
                   ;
```

```
static   trunk_t *nvtrk
#ifdef   ZC
                 = {}
endif
         ;
static   vmenu_t *mp
#ifdef   ZC
                 = {}
endif
         ;

pgmstrk()
        {
        static  byte    key;

if (inskey == INS_MENU)
                {
                lnreset();
                if (insmenu < M_OSYS) /* sys menus precede other sys menus */
                        mp = sysmenu[insmenu-M_SYS];
                else if (insmenu < M_T1) /* other sys menus precede trk menus */
                        mp = osmenu[insmenu-M_OSYS];
                else
                        {
```

Jan 17 17:20 1984  pgmstrk.c Page 4

```
                        trkno = phystrk[insmenu/100 - 1];
                        trk = &trkarr[trkno];
                        nvtrk = nv_trtab[trkno];
                        mp = trkmenu[insmenu%100 - 1];
                        }
                for (insval = mp->m_vals;  insval > 0;)
                        if ((*mp->m_get)() == mp->m_val[--insval])
                                break;
                }
        else if (bclass[inskey]==KC_DIGIT && (key=dlbtn[inskey])<=10)
                if (key == 10)
                        insval = 0;
                else if (key < mp->m_vals)
                        insval = key;
                else
                        { complain(); return; }
        else if (inskey == INS_DFLT)
                insval = mp->m_dflt;
        else if (inskey == INS_NVAL)
                {
                if (++insval >= mp->m_vals)
                        insval = 0;
                }
        else if (inskey == INS_STORE)
                {
                (*mp->m_set)(mp->m_val[insval]);
                confirm();
                return;
                }
        else
                {
                complain(); return;
                }
        disptwo(mp->m_hdr, mp->m_str[insval]);
        }
```

```
static
int
trcget()
        {
        return (conf.cf_trcltm);
        } static
trcset(trc)
short   trc;
        {
        NVM->nv_conf.cf_trcltm =
        conf.cf_trcltm = trc;
        } static
int
hrcget()
        {
        return (conf.cf_hrcltm);
```

Jan 17 17:20 1984  pgmstrk  Page 5

```
        } static
hrcset(hrc)
short   hrc;
        {
        NVM->nv_conf.cf_hrcltm =
        conf.cf_hrcltm = hrc;
        } static
int
orcget()
        {
        return (conf.cf_orcltm);
        } static
orcset(orc)
short   orc;
        {
        NVM->nv_conf.cf_orcltm =
        conf.cf_orcltm = orc;
        } static
int
bitget()
        {
        return (conf.cf_opt&mp->m_val[1]);
        } static
bitset(bit)
byte    bit;
        {
        conf.cf_opt &= ~mp->m_val[1];
        NVM->nv_conf.cf_opt =
        conf.cf_opt |= bit;
        }
```

```
static
int
codget()
        {
        return (conf.cf_opt&CF_DPARM);
        } static
codset(dial)
byte    dial;
        {
        conf.cf_opt &= ~CF_DPARM;
        NVM->nv_conf.cf_opt =
        conf.cf_opt |= CF_DPARM&dial;
        }

Jan 17 17:20 1984  pgmstrk.c Page 6 static
int
sigget()
        {
        return (trk->t_flags&TF_DTMF);
        } static
sigset(dial)
byte    dial;
        {
        trk->t_flags &= ~TF_DTMF;
        nvtrk->t_flags =
        trk->t_flags |= dial;
        } static
int
rngget()
        {
        return (trk->t_flags&TF_RNG);
        } static
rngset(flag)
byte    flag;
        {
        trk->t_flags &= ~TF_RNG;
        nvtrk->t_flags =
        trk->t_flags |= flag;
        } static
int
corget()
        {
        return (trk->t_corltm);
        } static
corset(corltm)
short   corltm;
        {
        nvtrk->t_corltm =
        trk->t_corltm = corltm;
        }
```

```
static
int
hsfget()
        {
        return (trk->t_hsftm);
        } static
```

Jan 17 17:20 1984    pgmstrk    Page 7

```
hsfset(hsftm)
byte    hsftm;
        {
        nvtrk->t_hsftm =
        trk->t_hsftm = hsftm;
        } static
int
nsvget()
        {
        return (trk->t_class&TC_NSV);
        } static
nsvset(svc)
byte    svc;
        {
        trk->t_class &= ~TC_NSV;
        nvtrk->t_class =
        trk->t_class |= svc;
        } static
int
pzget()
        {
        return (conf.cf_pgzn);
        } static
int
pzset(val)
short   val;
        {
        NVM->nv_conf.cf_pgzn =
        conf.cf_pgzn = val;
        } static
int
pbxget()
        {
        return (conf.cf_pbxcode);
        } static
pbxset(val)
short   val;
        {
        NVM->nv_conf.cf_pbxcode =
        conf.cf_pbxcode = val;
        }
```

```
static
int

Jan 17 17:20 1984  pgmstrK.c Page 8 pozget()
        {
        return (conf.cf_paustm);
        } static
pozset(val)
short   val;
        {
        NVM->nv_conf.cf_paustm =
        conf.cf_paustm = val;
        } extern byte db_cl;

static
int
dbgget()
        {
        return (db_cl);
        } static
dbgset(val)
short   val;
        {
        db_cl = val;
        } static
int
memget()
        {
        return ((int)NVM->nv_id[0]);
        } static
memset(val)
short   val;
        {
        *((short *)&NVM->nv_id[0]) = val;
        } static
int
tsget()
        {
        return( 0 );
        } static
tsset(val)
short   val;
        {
        static tst_t    *msg;
```

Jan 17 17:20 1984 pgmstrt...c Page 9

```
        if( val == TST_WANT_DTMF && (msg=TST_ALLOC) != NULL_TSTMSG )
            {
            msg->tst_prog = TST_MAIN;
            msg->tst_task = TST_INIT;
            msg->tst_scale = TST_ALL;
            enqueue( TEST, msg );
            }
        } static
int
cf2get()
        {
        return (conf.cf_opt2&mp->m_val[1]);
        } static
cf2set(bit)
byte    bit;
        {
        conf.cf_opt2 &= ~mp->m_val[1];
        NVM->nv_conf.cf_opt2 =
        conf.cf_opt2 |= bit;
        }
```

Dec  9 16:53 1983  pgmtnnt.c Page 1

```
/** zc -c -DZC -I$INCLUDE -x14 %
** Installer dialogue: program tenant partitions -- TEMPORARILY EXCLUDED,
*                      tho Soft Page Group Programming remains;
*/
include <install.h>
include <trstf.h>

;
static  lineT   line
#ifdef  ZC
                = {}
endif
        ;

static  ledv_t  led
#ifdef  ZC
                = {}
endif
        ;

static  byte    sno
#ifdef  ZC
                = {}
endif
        ;

static  stn_t   *stn
#ifdef  ZC
                = {}
endif
        ;
```

```c
typedef struct gmenu_t {
        char    **m_hdrv;
        byte    *m_val;
        byte    m_vals;
        byte    m_dfgr;
        byte    m_mask;
        byte    m_shft;
} gmenu_t;

#define NULL_VAL ((byte*)0)

static  char    *sfpgs[] = {"SOFT PAGE GR"};
static  gmenu_t sfpgmnu = {sfpgs, NULL_VAL, 1, 0, SF_PAGE, GS_PAGE};

static  gmenu_t *grpmenu[] = {&sfpgmnu };

static
byte
tenants(count, oflg, nflg)
byte    count;
byte    oflg;
byte    nflg;
        {
        return (count==0 || oflg&SF_SHRD ? nflg : oflg);
```

Dec  9 16:53 1982  pgmtnn  Page 2
          t.c

```c
        } pgmgrps()
        {
        static  gmenu_t *mp;
        static  byte    gno;
        static  byte    gfld;
        static  byte    gfn;
        static  byte    gcount;
        static  byte    flags;
        static  byte    *p;

if (inskey == INS_MENU)
                {
                mp = grpmenu[insmenu/10 - 73;    /* magic numbers */
                gno = insmenu%10;
                gfld = gno << mp->m_shft;
                --gno;
                if (insmenu < M_APPR)
                        insval = 0;
                else for (insval = mp->m_vals; insval>0; --insval)
                        if (mp->m_val[insval]==grptab[gno]->ident)
                                break;
                display(mp->m_hdrv[insval]);
                gcount = 0;
                for (line = 0;  line < NO_BTNS;  ++line)
                        {
                        if (line >= PC_STNS ||
                                        (stn=stntab[physstn[line]])==NULL_STN)
                                led = LED_OFF;
                        else if ( stn->s_group & gfld )
                                flags = tenants(gcount++, flags, stn->s_flags),
                                led = LED_SLOW;
                        else
                                led = LED_STDY;
                        lineled[line]=led;
```

```
                }
            lnupdate();
            }
        else if (bclass[inskey] == KC_LINE)
            {
            if ((led=lineled[line=dlbtn[inskey]]) == LED_SLOW)
                {
                lnlight(line, LED_STDY);
                --gcount;
                }
            else if (led==LED_STDY
                && ((gfn=(stn=stntab[physstn[line]])->s_group&mp->m_mask&GF_APPR)==0
                    || gfn )= gfld)
                && (gcount==0 || flags&SF_SHRD
                    || (flags&SF_TNNT) == (stn->s_flags&SF_TNNT)))
                {
                flags = tenants(gcount++, flags, stn->s_flags);
                lnlight(line, LED_SLOW);
                }
            else
``` ec  9 16:53 1983  pgmtnnt.c Page 3

```
                complain();
            }
        else if (inskey == INS_DFLT)
            {
            for (line = 0;  line < NO_BTNS;  ++line)
                {
                if (line )= PC_STNS ||
                            (stn=stntab[physstn[line]])==NULL_STN)
                    led = LED_OFF;
                else if (mp->m_dfgr && ((stn->s_flags&SF_TNNT)!=0)==gno)
                    led = LED_SLOW;
                else
                    led = LED_STDY;
                lineled[line] = led;
                }
            lnupdate();
            }
        else if (inskey == INS_STORE)
            {
            for (line = 0;  line < PC_STNS;  ++line)
                {
                if( (stn = stntab[sno=physstn[line]]) &&
                    ( (led=lineled[line]) == LED_SLOW
                    || led == LED_STDY && (stn->s_group&gfld)==gfld))
                    {
                    p = &stn->s_group;
                    if (led == LED_SLOW)
                        *p |= gfld;
                    else /* if( led == LED_STDY ) */
                        *p &= ~gfld;
                    nv_sttab[sno]->s_group = *p;
                    /* if (mp->m_vals ) 1)
                        {
                        nv_grtab[gno]->ng_ident =
                        grptab[gno]->ident =
                            mp->m_val[insval];
                        nv_grtab[gno]->ng_num =
                        grptab[gno]->g_num = gcount;
                        } */
```

```
                        }
                confirm();
                }
        else if (insmenu < M_APPR)
                {
                complain();
                }
        else if (bclass[inskey]==KC_DIGIT && (line=dlbtn[inskey])<=10)
                {
                if (line == 10)
                        line = 0;
                if (line < mp->m_vals)
                        display(mp->m_hdrv[insval=line]);
                else
                        complain();
                }
```

Dec  7 16:53 1983    pgmtnnt.c Page 4

```
        else if (inskey == INS_NVAL)
                {
                if (++insval >= mp->m_vals)
                        insval = 0;
                display(mp->m_hdrv[insval]);
                }
        else
                complain();
        }
```

Jan 17 10:13 1984    pgmtsn.c Page 1

```
/*% zc -c -DZC -I$INCLUDE -x14 %
** Installer dialogue: program trunk X station parameters
*/ include <install.h>
include <trstf.h> typedef struct  tmenu_t {
        char    *m_hdr;
        ledv_t  (*m_get)();
        void    (*m_set)();
        bool    m_dflt;
        byte    m_bits;
} tmenu_t;

static  ledv_t   pvtget();
static  tmenu_t  pvtmenu = {"ACCESS LINE",  &pvtget, &trkset, TRUE, TS_IOFL};

static  ledv_t   trkget();
static           trkset();
static  tmenu_t  outmenu = {"OUTGOING USE", &trkget, &trkset, TRUE, TS_OUT};

static  tmenu_t  incmenu = {"INCOMING USE", &trkget, &trkset, TRUE, TS_IN};

static  ledv_t   audget();
static  tmenu_t  audmenu = {"AUDIBLE RING", &audget, &trkset, TRUE, TS_RING};

static  tmenu_t  nrgmenu = {"NITE RING GR", &trkget, &trkset, TRUE, TS_NITE};
```

```
static   ledv_t   autget();
static   autset();
static   tmenu_t  autmenu = {"AUTO-SELECT",  &autget, &autset, FALSE};

static   tmenu_t  *menuvec[] = { &pvtmenu, &out    , &incmenu,
                                 &audmenu, &nrgmenu, &autmenu};

static   tmenu_t  ohsmenu = {"OFF HK SIGNL", &trkget, &trkset, TRUE, TS_OFFH};

static   byte     trkno
#ifdef   ZC
                  = {}
endif
                  ;
static   byte     stnno
#ifdef   ZC
                  = {}
endif
                  ;
static   byte     line
#ifdef   ZC
                  = {}
endif
static   byte     flgs
#ifdef   ZC
                  = {}
endif Jan 17 10:13 1984  pgmtsn.c   age 2

;
static   byte     bits
#ifdef   ZC
                  = {}
endif
                  ;
static   stn_t    *stn
#ifdef   ZC
                  = {}
endif
                  ;
static   ledv_t   led
#ifdef   ZC
                  = {}
endif
                  ;
static   byte     *trstfp
#ifdef   ZC
                  = {}
endif
                  ;

pgmtsn()
        {
        static  tmenu_t *mp;

if (inskey == INS_MENU)
                {
                if( insmenu == M_OHS )
                        {
                        trkno = 0;
                        mp = &ohsmenu;
                        }
```

```
                    else
                            {
                            trkno = phystrk[insmenu/100 - 1];
                            mp = menuvec[insmenu%100 - 6];  /* magic numbers */
                            }
                    bits = mp->m_bits;
                    display(mp->m_hdr);
                    for (line = 0;  line < NO_BTNS;  ++line)
                            {
                            if( line >= PC_STNS
                                    ||(stn=stntab[stnno=physstn[line]]) == NULL_STN
                                            ||  stn->s_ident != ID_STN )
                                    lineled[line] = LED_OFF;
                            else
                                    {
                                    trstfp = &trstf[trkno][stnno];
                                    lineled[line] = (*mp->m_get)();
                                    }
                            }
                    lnupdate();
                    }
            else if (bclass[inskey] == KC_LINE)
                    {
```

Jan 17 10:13 1984  pgmtsn.c Page 3

```
                    if ((led=lineled[line=dlbtn[inskey]]) == LED_OFF)
                            complain();
                    else
                            lnlight(line, led==LED_STDY ? LED_SLOW : LED_STDY);
                    }
            else if (inskey == INS_DFLT)
                    {
                    for (line = 0;  line < NO_BTNS;  ++line)
                            if (lineled[line] != LED_OFF)
                                    lineled[line] = mp->m_dflt
                                                    ? LED_SLOW : LED_STDY;
                    }
            else if (inskey == INS_STORE)
                    {
                    for (line = 0;  line < NO_BTNS;  ++line)
                            if( (led=lineled[line]) != LED_OFF)
                                    {
                                    stn = stntab[stnno = physstn[line]];
                                    trstfp = &trstf[trkno][stnno];
                                    (*mp->m_set)();
                                    }
                    confirm();
                    }
            else
                    complain();
            }
static
ledv_t
trkget()
        {
        return (*trstfp&bits ? LED_SLOW : LED_STDY);
        } static
trkset()
        {
```

```
                if (led == LED_STDY)
                        *trstfp &= ~bits;
                else    /* lineled[line] == LED_SLOW */
                        *trstfp |= bits;
                NVM->nv_trstf[trkno][stnno] = *trstfp & (TS_IOFL+TS_OFFH);
                } static
ledv_t
pvtget()
        {
        return( (*trstfp&(TS_IN+TS_OUT)) == 0 ? LED_STDY : LED_SLOW);
        } static
ledv_t
autget()
        {
        return (stn->s_cosel[0]==trkno ? LED_SLOW : LED_STDY);
        }

Jan 17 10:13 1984  pgmtsn.c  age 4

} static
autset()
        {
        extern nvstn_t *nv_sttab[];

flgs = stn->s_cosel[0];
        nv_sttab[stnno]->ns_cosel[0] = stn->s_cosel[0] =
                (led == LED_SLOW) ? trkno : ((flgs==trkno)?NOT_LN:flgs);
        } static
ledv_t
audget()
        {
        if( ((flgs = *trstfp)&TS_IN) == 0 )
                return (LED_OFF);
        else
                return (flgs&TS_RING ? LED_SLOW : LED_STDY);
        }

Dec  9 16:53 1983  pgmtype.c Page 1

/*% zc -c -DZC -I$INCLUDE -x14 %
** Installer dialogue: trunk and station programming
*/ include (install.h)
include (trstf.h)

typedef struct {
        char    *m_typ;
        char    *m_hdr;
        bool    (*m_show)();
        void    (*m_doit)();
        void    (*m_stor)();
        menu_t  m_menu;
        lineT   m_line;
```

```
            bool    m_bkwd;
            byte    m_dflt;
            byte    m_vals;
            byte    *m_val;
            char    **m_str;
} tmenu_t;

static  bool    showln();

static  bool    showstn();
static  dostn();
static  storstn();

static  byte    stval[] = {ID_NONE, ID_STN, ID_ICM, ID_RCD};
static  char    *sstr[] = {"NONE", "KEYSET", "I/COM", "RCRDR"};

static  tmenu_t stpmenu = {"STATION TYPE", "SN 00=",
                            &showstn, &dostn, &storstn,
                            M_STYP, PC_STNS, FALSE, 1, 4, stval, sstr};

static  bool    showtrk();
static  dotrk();
static  stortrk();

static  byte    ttval[] = {ID_NONE, ID_TRK, ID_PAGE, ID_RCD};
static  char    *tstr[] = {"NONE", "CO TRK", "X PAGE", "RELAY"};

static  tmenu_t ttpmenu = {"CO LINE TYPE", "TR 00=",
                            &showtrk, &dotrk, &stortrk,
                            M_TTYP, NO_BTNS-PC_TRUNKS, TRUE, 1, 4, ttval, tstr};

static  storsdr();

static  byte    drval[] = {0, 1, 2, 3, 4, 5, 6, 7};
static  char    *dstr[] = {"0", "1", "2", "3", "4", "5", "6", "7"};

static  tmenu_t sdrmenu = {"STN DIAL RST", "DIAL RSTR=",
                            &showstn, NULL, &storsdr,
                            M_SDR, PC_STNS, FALSE, 0, 3, drval, dstr};

static  byte    lno

Dec  7 16:53 1983  pgmtype.c  Page 2 ifdef ZC
            = {}
endif
            ;
static  tmenu_t *mp
#ifdef ZC
            = {}
endif
            ;
static  lineT   line
#ifdef ZC
            = {}
endif
            ;
static  lineT   newline
#ifdef ZC
            = {}
endif
            ;
```

```
static    lineT    frmline
#ifdef    ZC
                    = {}
endif
        ;

pgmtype()
        {
        if (insfn != INS_MENU)
                {
                if (bclass[inskey] == KC_LINE)
                        {
                        if ((newline=dlbtn[inskey]) == line)
                                {
                                insfn = INS_MENU;
                                light(insdev, fnled, LED_OFF);
                                showln(line, frmline, LED_FAST);
                                }
                        else if (!showln(newline, frmline, LED_SLOW))
                                complain();
                        else
                                frmline = newline;
                        }
                else
                        {
                        if (inskey == INS_STORE)
                                {
                                (*mp->m_doit)();
                                confirm();
                                }
                        if (inskey == INS_STORE || inskey == insfn)
                                {
                                insfn = INS_MENU;
                                light(insdev, fnled, LED_OFF);
                                showln(line, frmline, LED_FAST);
                                }
                        else
```

Dec  7 16:53 1983  pgmtype.c  Page 2

```
#ifdef    ZC
                    = {}
endif
        ;
static    tmenu_t *mp
#ifdef    ZC
                    = {}
endif
        ;
static    lineT    line
#ifdef    ZC
                    = {}
endif
        ;
static    lineT    newline
#ifdef    ZC
                    = {}
endif
        ;
static    lineT    frmline
#ifdef    ZC
                    = {}
endif
        ;
```

```
pgmtype()
    {
    if (insfn != INS_MENU)
        {
        if (bclass[inskey] == KC_LINE)
            {
            if ((newline=dlbtn[inskey]) == line)
                {
                insfn = INS_MENU;
                light(insdev, fnled, LED_OFF);
                showln(line, frmline, LED_FAST);
                }
            else if (!showln(newline, frmline, LED_SLOW))
                complain();
            else
                frmline = newline;
            }
        else
            {
            if (inskey == INS_STORE)
                {
                (*mp->m_doit)();
                confirm();
                }
            if (inskey == INS_STORE || inskey == insfn)
                {
                insfn = INS_MENU;
                light(insdev, fnled, LED_OFF);
                showln(line, frmline, LED_FAST);
                }
            else
```

```
                            complain();
                }
            return;
            }
        if (inskey == INS_MENU)
            {
            insfn = INS_MENU;
            if (insmenu<M_TTYP)
                {
                mp = &stpmenu;
                newline = insmenu - M_STYP-1;
                }
            else if (insmenu<M_SDR)
                {
                mp = &ttpmenu;
                newline = NO_BTNS+M_TTYP;   newline -= insmenu;
                }
            else
                {
                mp = &sdrmenu;
                newline = insmenu - M_SDR-1;
                }
            for (line = 0;  line < NO_BTNS;  ++line)
                    lineled[line] = (line<(mp->m_line)==mp->m_bkwd
                                    ? LED_OFF : LED_STDY;
            lnupdate();
            if (insmenu == mp->m_menu
              || !showln(line=newline, NOT_LN, LED_FAST))
```

```
                    {
                    line = NOT_LN;
                    insmenu = mp->m_menu;
                    display(mp->m_typ);
                    }
            return;
            }
    else if (bclass[inskey] == KC_LINE)
            {
            if (!showln(newline=dlbtn[inskey], line, LED_FAST))
                    complain();
            else
                    line = newline;
            return;
            }
    else if (insmenu == mp->m_menu)
            { complain(); return; }
    else if (bclass[inskey]==KC_DIGIT && (newline=dlbtn[inskey])<=10)
            if (newline == 10)
                    insval = 0;
            else if (newline < mp->m_vals)
                    insval = newline;
            else
                    { complain(); return; }
    else if (inskey == INS_DFLT)
            insval = mp->m_dflt;
    else if (inskey == INS_NVAL)
            {

Dec  9 16:53 1983  pgmtype..c Page 4 if (++insval >= mp->m_vals)
                    insval = 0;
            }
    else if (inskey == INS_STORE)
            {
            (*mp->m_stor)();
            confirm();
            }
    else if (M_SDR < insmenu)
            { complain(); return; }
    else if (inskey == INS_COPY)
            {
            dispfn("COPY OF", COPY_LED);
            return;
            }
    else if (inskey == INS_XCHG)
            {
            dispfn("EXCHANGE", XCHG_LED);
            return;
            }
    else
            { complain(); return; }
    displn();
    } static
dispfn(msg, led)
char    *msg;
ledv_t  led;
    {
    display(msg);
    light(insdev, fnled=led, LED_STDY);
```

```
                insfn = inskey;
                frmline = NOT_LN;
                } static
displn()
        {
        static  char    hdr[11];

strcpy(hdr, mp->m_hdr);
        if (insmenu ( M_SDR)
                { ++lno; hdr[3] += lno/10;  hdr[4] += lno%10;  --lno; }
        disptwo(hdr, mp->m_str[insval]);
        } static  byte    ident
ifdef  ZC
                = {}
endif
        ;

static stn_t    *stn
#ifdef ZC
                = {}
```

Dec 9 16:53 1983 pgmtype.c Page 5

```
#endif
        ;

static
bool
showln(newline, oldline, ledshow)
lineT   newline;
lineT   oldline;
ledv_t  ledshow;
        {
        if (!(*mp->m_show)(newline))           /* not legal */
                return (FALSE);
        lnlight(oldline, LED_STDY);
        lnlight(newline, ledshow);
        if (M_SDR ( insmenu)
                insval = stn->s_drst;
        else for (insval = mp->m_vals; insval > 0; --insval)
                if (ident == mp->m_val[insval])
                        break;
        displn();
        return (TRUE);
        } static
bool
showstn(newline)
lineT   newline;
        {
        if (PC_STNS <= newline)              /* not legal station */
                return (FALSE);
        insmenu = mp->m_menu+newline+1;
        lno = physstn[newline];
        ident = (stn=stntab[lno])!=NULL_STN ? stn->s_ident : ID_NONE;
        return (TRUE);
        }
```

```
static
dostn()
        {
        if (insfn == INS_COPY)
                {
                stncopy(line, frmline);
                stn = &stnarr[line];
                stnupd();
                }
        else
                stnxchg(line, frmline);
        } static
storstn()
        {
        stn = &stnarr[lno];
        stn->s_ident = ident = stpmenu.m_val[insval];
        nv_sttab[lno]->s_ident = ident;
        trstfupd( (ident==ID_NONE) ? 0 : TS_IOFL, lno );
```

Dec  9 16:53 1983   pgmtype.c  page 6

```
        stnupd();
        } static
stnupd()
        {
        static byte     no, st;
        static stn_t    **stp;
        byte            busystn();

stp = &stntab[no=stn->s_port];
        if( (ident=stn->s_ident) == ID_NONE )
                {
                stnstat( stn, 0 );
                *stp = NULL_STN;
                stn->s_st = ST_IDLE;
                }
        else
                {
                if( ident == ID_STN )
                        {
                        if( insdev == no )
                                stn->s_st = ST_INST;
                        if( busystn(stn) )
                                stnstat( stn, LED_STDY );
                        }
                *stp = stn;
                }
        btninit();
        } static
trstfupd( val, no )
        byte    val, no;
        {
        static byte     tno;
        for( tno=0; tno<PC_TRUNKS; tno++ )
                trstf[tno][no] = val;
        }
```

```
static   trunk_t *trk
#ifdef ZC
        = {}
endif
        ;

static
bool
showtrk(newline)
lineT   newline;
        { if (newline < NO_BTNS-PC_TRUNKS)
                return (FALSE);
        lno = NO_BTNS-1;  lno -= newline;        /* Kludge around comp bug */
        insmenu = M_TTYP+lno+1;
```

Dec  9 16:53 1983   pgmtype.c Page 7

```
        lno = phystrk[lno];
        ident = (trk=trktab[lno])!=NULL_TRUNK ? trk->t_ident : ID_NONE;
        return (TRUE);
        } static
dotrk()
        {
        newline = NO_BTNS - 1;           /* c1 bug */
        f (insfn == INS_COPY)
                trkcopy(newline-line, newline-frmline);
        else
                trkxchg(newline-line, newline-frmline);
        } static
stortrk()
        {
        static trunk_t  **trp;
        static byte     val;

trp = &trktab[lno];
        trk = &trkarr[lno];
        val = ttpmenu.m_val[insval];
        *trp = ((trk->t_ident=val)==ID_NONE) ? NULL_TRUNK : trk;
        nv_trtab[lno]->t_ident = val;
        } static
storsdr()
        {
        nv_sttab[lno]->s_drst = stn->s_drst = insval;
        }
```

We claim:

1. A programmable key telephone system having a key service unit ("KSU") and a plurality of interchangeable telephones coupled to said KSU, said system comprising:

a KSU microcomputer;

an alphanumeric display coupled to said microcomputer at the KSU;

means operatively associated with said microcomputer for driving said display to prompt an installer through a sequence of steps designed to elicit instructions for programming system features;

means for uncoupling a telephone from a normal operating location in the key telephone system remote from the KSU and recoupling it to said microcomputer at the KSU to enable an installer to input instructions via the recoupled telephone's keys in response to prompts concurrently viewed on said display; and non-volatile memory means coupled to said microcomputer for storing system feature data in accordance with the instructions entered by an installer.

2. The system of claim 1 further comprising:

telephone interface circuit means in said KSU for coupling said plurality of telephones to said microcomputer to provide data communication between the microcomputer and telephones during the normal operation of the telephone system; and installer switch means for disconnecting one of said telephones from the telephone interface circuit means and placing said microcomputer into an installation mode of operation;

whereby a telephone to be used by an installer for programming system features can utilize the portion of said interface circuit means from which said one telephone has been disconnected.

3. The system of claim 2 wherein said uncoupling and recoupling means comprises a standard modular jack and plug arrangement.

4. The system of claim 2 further comprising means for operating said microcomputer to provide normal telephone operations for all but said one disconnected telephone while simultaneously operating in the installation mode to allow programming or re-programming of system features.

5. A programmable key service unit for a key telephone system comprising:

means for coupling a plurality of remotely located interchangeable telephones to the key service unit;

means for coupling a plurality of outside telephone lines to the key service unit;

a microcomputer;

means responsive to said microcomputer for completing calls between said telephones and between telephones and outside lines;

means for placing said microcomputer into a programming mode of operation;

means for uncoupling a remotely located interchangeable telephone from said key service unit and recoupling it to said microcomputer at the key service unit for use as a data input terminal during said programming mode of operation;

an alphanumeric display coupled to said microcomputer;

means for driving said display during said programming mode of operation to prompt a system programmer to enter instructions via said data input terminal as to system features to be programmed; and non-volatile memory means coupled to said microcomputer for storing system feature data entered during said programming mode of operation.

6. The key service unit of claim 5 wherein said means for recoupling a telephone to said microcomputer for use as a data input terminal comprises means for disconnecting one of said plurality of telephones from said key service unit to make circuitry normally used by the disconnected telephone available for use by the data input terminal.

7. The key service unit of claim 5 wherein said means for placing said microcomputer into the programming mode of operation enables operation of the key service unit call completing means to continue during the programming mode of operation.

8. The key service unit of claim 5 wherein each of said telephones comprises:

a plurality of switches for placing calls and implementing features provided by the key service unit; and a plurality of indicator lamps, each associated with one of said switches;

whereby a programmer using a telephone as a data input terminal can use said switches to enter instructions to the microcomputer.

9. The key service unit of claim 8 further comprising means for driving the indicator lamps on the telephone serving as the data input terminal, during the programming mode of operation, to provide additional prompting to a system programmer as to features being programmed.

10. The key service unit of claim 9 wherein the data input terminal indicator lamps are used to identify to a system programmer which particular telephone station coupled to said key service unit is currently being programmed.

11. The key service unit of claim 9 wherein the prompts provided by said indicator lamp and display driving means sequentially step a system programmer through a predetermined series of features to be programmed.

12. The key service unit of claim 11 further comprising means for enabling a system programmer to skip over one or more categories of features for which prompts are provided.

* * * * *